United States Patent
Yoshiura et al.

(10) Patent No.: US 11,878,429 B2
(45) Date of Patent: Jan. 23, 2024

(54) ROBOT CONTROL APPARATUS, ROBOT CONTROL SYSTEM, AND ROBOT CONTROL METHOD

(71) Applicant: KABUSHIKI KAISHA YASKAWA DENKI, Kitakyushu (JP)

(72) Inventors: Yasufumi Yoshiura, Kitakyushu (JP); Teruhisa Kitagawa, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 93 days.

(21) Appl. No.: 17/190,411

(22) Filed: Mar. 3, 2021

(65) Prior Publication Data
US 2021/0291371 A1  Sep. 23, 2021

(30) Foreign Application Priority Data
Mar. 18, 2020  (JP) .................................. 2020-048095

(51) Int. Cl.
| | |
|---|---|
| B25J 9/16 | (2006.01) |
| B25J 9/02 | (2006.01) |
| B25J 9/10 | (2006.01) |
| B25J 9/12 | (2006.01) |

(52) U.S. Cl.
CPC ............. *B25J 9/1674* (2013.01); *B25J 9/023* (2013.01); *B25J 9/106* (2013.01); *B25J 9/123* (2013.01); *B25J 9/1623* (2013.01); *B25J 9/1633* (2013.01); *B25J 9/1664* (2013.01)

(58) Field of Classification Search
CPC ... B25J 9/023; B25J 9/106; B25J 9/123; B25J 9/1623; B25J 9/1633; B25J 9/1664; B25J 9/1674; B25J 9/0051; G05B 2219/40235; G05B 2219/40267; G05B 2219/79278; G05B 2219/40317; B23Q 17/0961
See application file for complete search history.

(56) References Cited

U.S. PATENT DOCUMENTS

| | | | |
|---|---|---|---|
| 2013/0060381 A1* | 3/2013 | Nakanishi ............ | B25J 17/0266 700/258 |
| 2018/0361578 A1* | 12/2018 | Muneto .................. | B25J 9/1605 |
| 2019/0118378 A1* | 4/2019 | Ludban ................ | B25J 17/0258 |

(Continued)

FOREIGN PATENT DOCUMENTS

| | | |
|---|---|---|
| EP | 2090407 | 8/2009 |
| JP | 2004-364396 | 12/2004 |

(Continued)

OTHER PUBLICATIONS

Japanese Office Action for corresponding JP Application No. 2020-048095, dated Jun. 15, 2021 (w/ English machine translation).

(Continued)

*Primary Examiner* — Dale Moyer
(74) *Attorney, Agent, or Firm* — MORI & WARD, LLP

(57) ABSTRACT

A robot control apparatus includes a drive controller configured to control a plurality of motors which are configured to drive a plurality of link mechanisms of a parallel link robot, respectively, and abnormality determination circuitry configured to determine based on state data of the plurality of motors whether at least one of collision of the parallel link robot and dislocation in the link mechanisms occurs.

13 Claims, 15 Drawing Sheets

(56) References Cited

U.S. PATENT DOCUMENTS

| | | | |
|---|---|---|---|
| 2019/0247998 A1* | 8/2019 | Nakagawa | B25J 17/0275 |
| 2020/0041381 A1 | 2/2020 | Inagaki et al. | |
| 2022/0194246 A1* | 6/2022 | Van Der Weijde | B25J 17/0216 |

FOREIGN PATENT DOCUMENTS

| | | |
|---|---|---|
| JP | 2016-112638 | 6/2016 |
| JP | 2020-22329 | 2/2020 |
| WO | WO 2016/206658 | 12/2016 |

OTHER PUBLICATIONS

Sami Haddadin et al., "Robot Collisions: a Survey on Detection, Isolation, and Identification", IEEE Transactions on Robotics, Dec. 1, 2017, pp. 1292-1312, vol. 33, No. 6, XP055434488.

Extended European Search Report for corresponding EP Application No. 21159929.5-1205, dated Jul. 12, 2021.

* cited by examiner

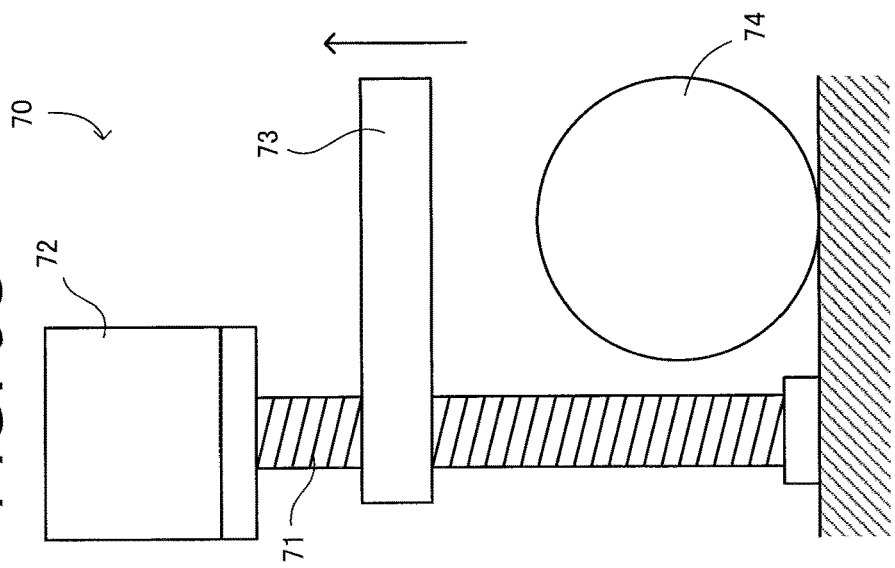
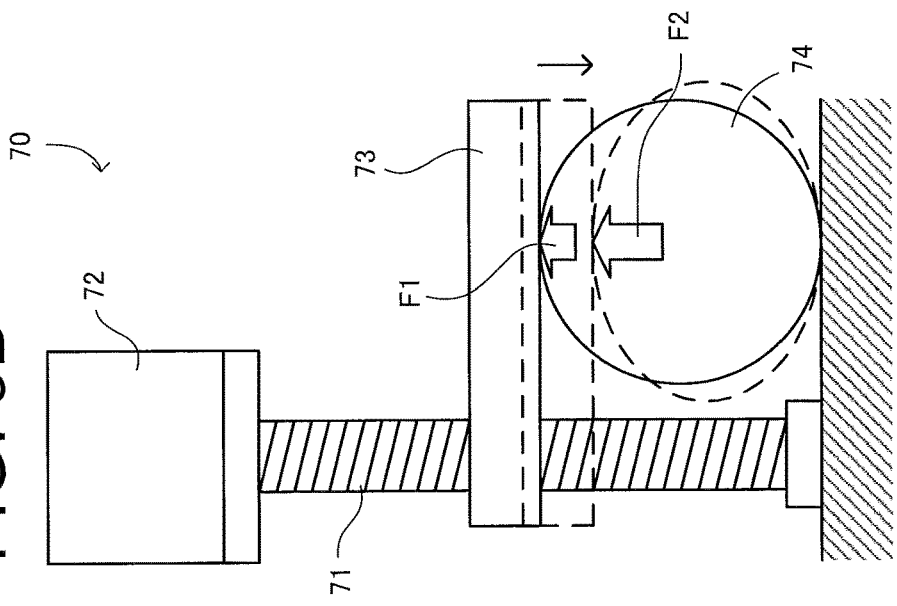
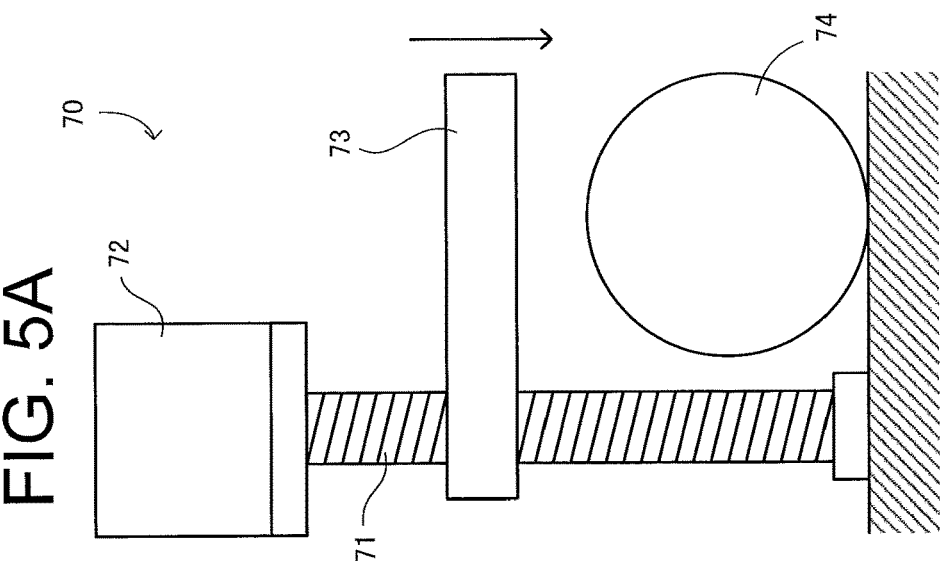

Top View

Side View

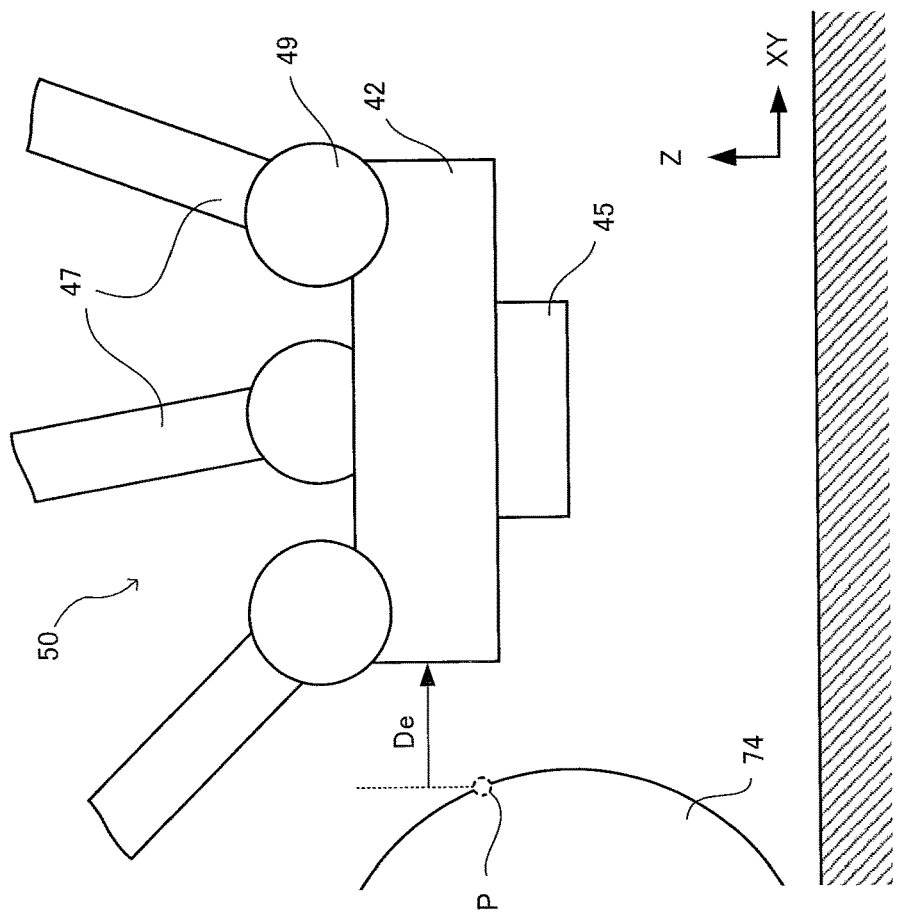
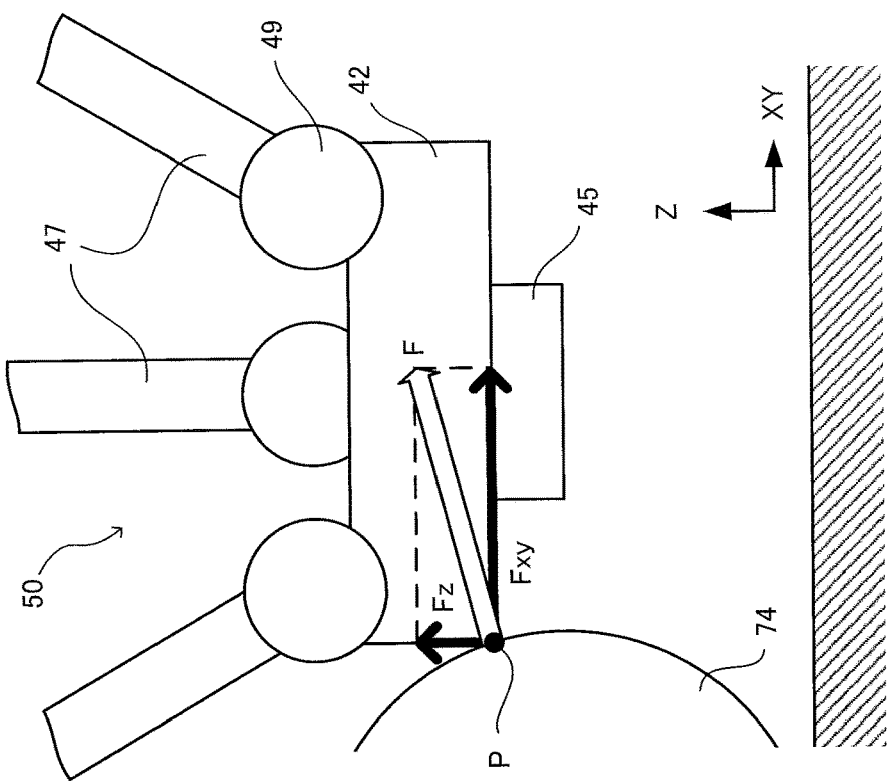

ROBOT CONTROL APPARATUS, ROBOT CONTROL SYSTEM, AND ROBOT CONTROL METHOD

CROSS-REFERENCE TO RELATED APPLICATIONS

The present application claims priority under 35 U.S.C. § 119 to Japanese Patent Application No. 2020-048095, filed Mar. 18, 2020. The contents of this application are incorporated herein by reference in their entirety.

BACKGROUND

Field of the Invention

The embodiment of this disclosure relates to a robot control apparatus, a robot control system, and a robot control method.

Discussion of the Background

For example, Japanese Patent Application Laid-Open No. 2020-022329 describes an abnormality monitoring device that extracts state information of a motor that drives a robot mechanism for each frequency band and detects an abnormality based on a value obtained by integrating outputs for each frequency band.

On the other hand, in the configuration in which the closed link mechanism is cooperatively controlled by the plurality of motors as in the parallel link robot, there is a situation in which the plurality of motors apply mutually different torques to cancel each other out, and the relationship of the state information between the motors becomes complicated. Therefore, it is difficult to determine the occurrence of an operation abnormality such as a collision and dislocation in a control of a parallel link robot using the state information of motors only as above-described prior arts.

SUMMARY

According to one aspect of the present invention, a robot control apparatus includes a drive controller which is configured to control a plurality of motors which are configured to drive a plurality of link mechanisms of a parallel link robot, respectively, and abnormality determination circuitry which is configured to determine based on state data of the plurality of motors whether at least one of collision of the parallel link robot and dislocation in the link mechanisms occurs.

According to another aspect of the present invention, a robot control system includes a parallel link robot and a robot control apparatus. The parallel link robot includes a plurality of link mechanisms, and a plurality of motors configured to drive the plurality of link mechanisms, respectively. The robot control apparatus includes a drive controller configured to control the plurality of motors, and abnormality determination circuitry configured to determine based on state data of the plurality of motors whether at least one of collision of the parallel link robot and dislocation in the link mechanisms occurs.

According to another aspect of the present invention, a robot control method executed by a processor includes controlling a plurality of motors which are configured to drive a plurality of link mechanisms of a parallel link robot, respectively; determining based on state data of the plurality of motors whether at least one of collision of the parallel link robot and dislocation in the link mechanisms occurs; controlling the plurality of motors so that the link mechanisms retreat when it is determined that the collision occurs; and stopping controlling the plurality of motors when it is determined that the dislocation occurs.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIGS. 5A, 5B and 5C are diagrams showing an example of a uniaxial drive mechanism model for explaining a collision determination method.

FIGS. 8A and 8B are diagrams showing an example of a countermeasure operation against a collision in the XY-axis directions.

DESCRIPTION OF THE EMBODIMENTS

Figure 1:
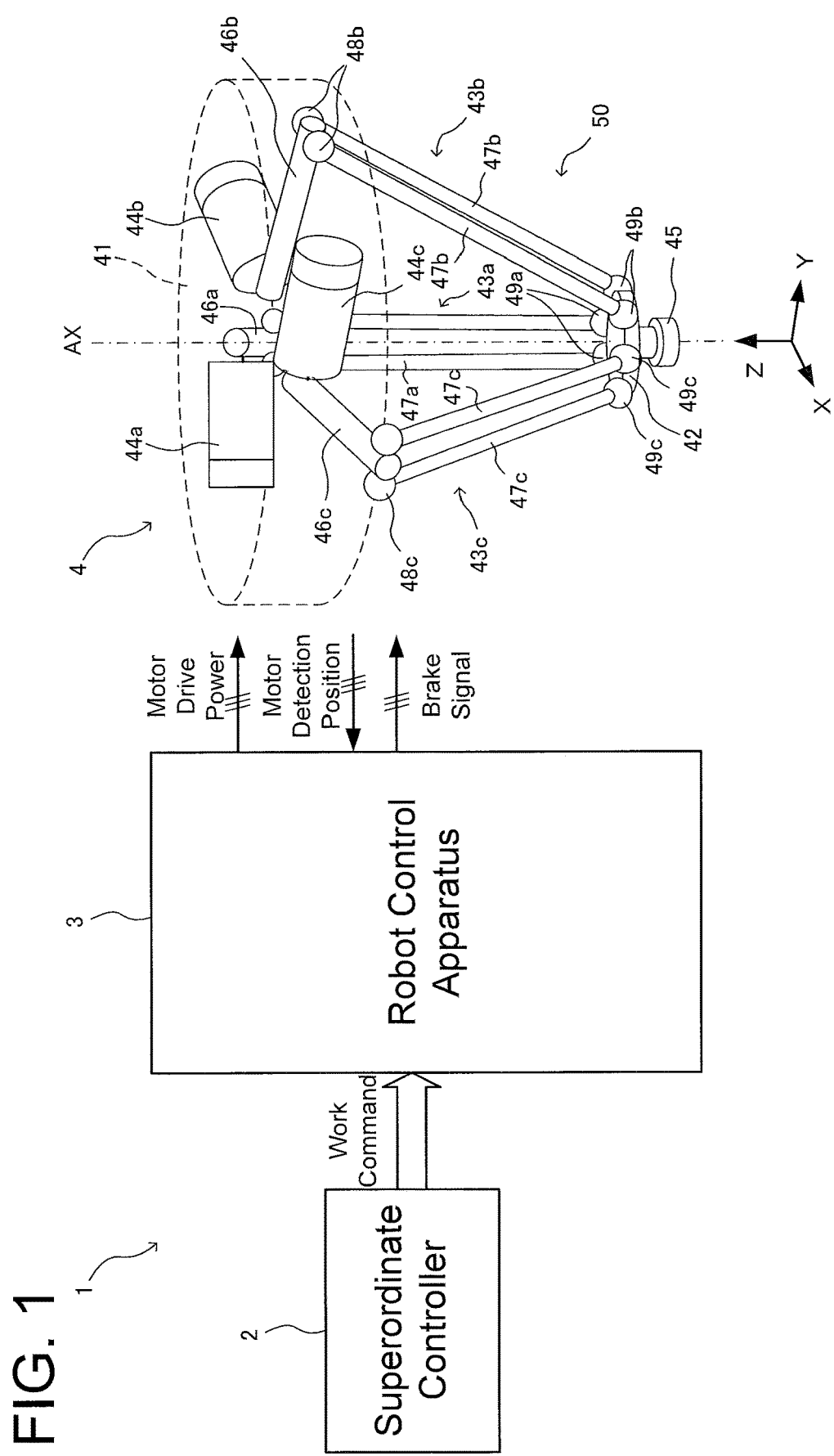
FIG. 1 is a perspective view showing an example of the overall configuration of a robot control system according to the first embodiment.

The embodiments will now be described with reference to the accompanying drawings, wherein like reference numerals designate corresponding or identical elements throughout the various drawings.

1. First Embodiment

1-1. Schematic Configuration of Robot Control System

Hereinafter, a robot control system according to a first embodiment will be described with reference to the drawings. The robot control system illustrated in an example of the present embodiment is a system that controls a parallel link robot that performs a transfer operation or the like of a workpiece such as a pick and place operation, for example. The robot control system 1 shown in FIG. 1 includes a superordinate controller 2, a robot control apparatus 3, and a parallel rink robot 4. Note that, in the following, for convenience of description of the configuration of the parallel link robot 4 and the like, directions such as up, down, left, right, front, and rear may be used as appropriate, but the positional relationship of each configuration of the parallel link robot and the like is not limited thereto.

The superordinate controller 2 specifies, for example, an input operation by a user or a type of work to be performed by the parallel link robot 4 via a communication line (not shown), and outputs a corresponding work command to the robot control apparatus 3 described later.

The robot control apparatus 3 controls the operation of the parallel link robot 4 by supplying motor drive power to each of the plurality of motors 44 included in the parallel link robot 4 in accordance with a predetermined work sequence corresponding to the work command input from the superordinate controller 2. As described later, the plurality of motors 44 of the parallel link robot 4 are provided with encoder units 14 that detect the rotational positions of the rotors as motor detection positions, and the robot control apparatus 3 controls the supply of motor drive power so as to realize the operation based on the work sequence with reference to the motor detection positions. The internal configuration and processing contents of the robot control apparatus 3 will be described later in detail (see FIG. 3 described later).

The parallel link robot 4 includes three motors 44 in the illustrated example and is a mechanical system capable of performing operation control such as moving an end effector (not particularly illustrated) to an arbitrary coordinate position in its operation space by axial driving of each of the motors 44.

1-2. Configuration of Parallel Link Robot

As shown in FIG. 1, the parallel link robot 4 of this example includes a base portion 41, a movable portion 42, three link mechanism portions (a plurality of link mechanisms) 43a, 43b, and 43c, and three motors 44a, 44b, and 44c.

The three link mechanism portions 43a, 43b, and 43c are arranged along the circumferential direction around the central axis AX of the parallel link robot 4 and connect the base portion 41 and the movable portion 42. The three motors 44a, 44b, and 44c are arranged on the base portion 41, and drive the link mechanism portions 43a, 43b, and 43c, respectively. The base portion 41 is formed in a disk shape in this example, and three motors 44a, 44b, and 44c are fixedly accommodated inside the base portion 41. The movable portion 42 is formed in a disk shape in this example and includes an attachment member 45 at a lower end thereof. An end effector (not shown), such as a robot hand, is attached to the attachment member 45. The configuration of each of the motors 44a to 44c will be described in detail later (see FIG. 2 described later).

All of the three link mechanism portions 43a to 43c have the same configuration. The link mechanism portion 43a includes a drive link 46a coupled to the output shaft of the motor 44a, and two passive links 47a coupled to the drive link 46a and the movable portion 42. The two passive links 47a are coupled to the drive link 46a via spherical bearings 48a respectively, and are coupled to the movable portion 42 via spherical bearings 49a, respectively. The link mechanism portion 43b includes a drive link 46b coupled to the output shaft of the motor 44b, and two passive links 47b coupled to the drive link 46b and the movable portion 42. The two passive links 47b are coupled to the drive link 46b via spherical bearings 48b respectively, and are coupled to the movable portion 42 via spherical bearings 49b, respectively. The link mechanism portion 43c includes a drive link 46c coupled to an output shaft of the motor 44c, and two passive links 47c coupled to the drive link 46c via spherical bearings 46c, respectively, and are coupled to the movable portion 42 via spherical bearings 49c, respectively. The drive links 46a, 46b, and 46c are members in a linear shape, which are extendedly arranged in a radial direction centered on a central axis AX. In the present embodiment, the three link mechanism portions 43a, 43b, and 43c, the movable portion 42, the attachment member 45, and the end effector (not shown in particular) are collectively referred to as a mechanism portion 50.

In the parallel link robot 4, a robot coordinate system of XYZ-axis orthogonal coordinates in which the Z-axis direction corresponds to the vertical direction in the operation space of the end effector is set. The motor 44 included in the parallel link robot 4 and the link mechanism portions 43 which was corresponding thereto are not limited to the three sets shown in the illustrated example, and it is possible to have a configuration of including four sets or more (i. e., four axes or more, such as a configuration of multiaxial drive type (not shown).

Figure 2:
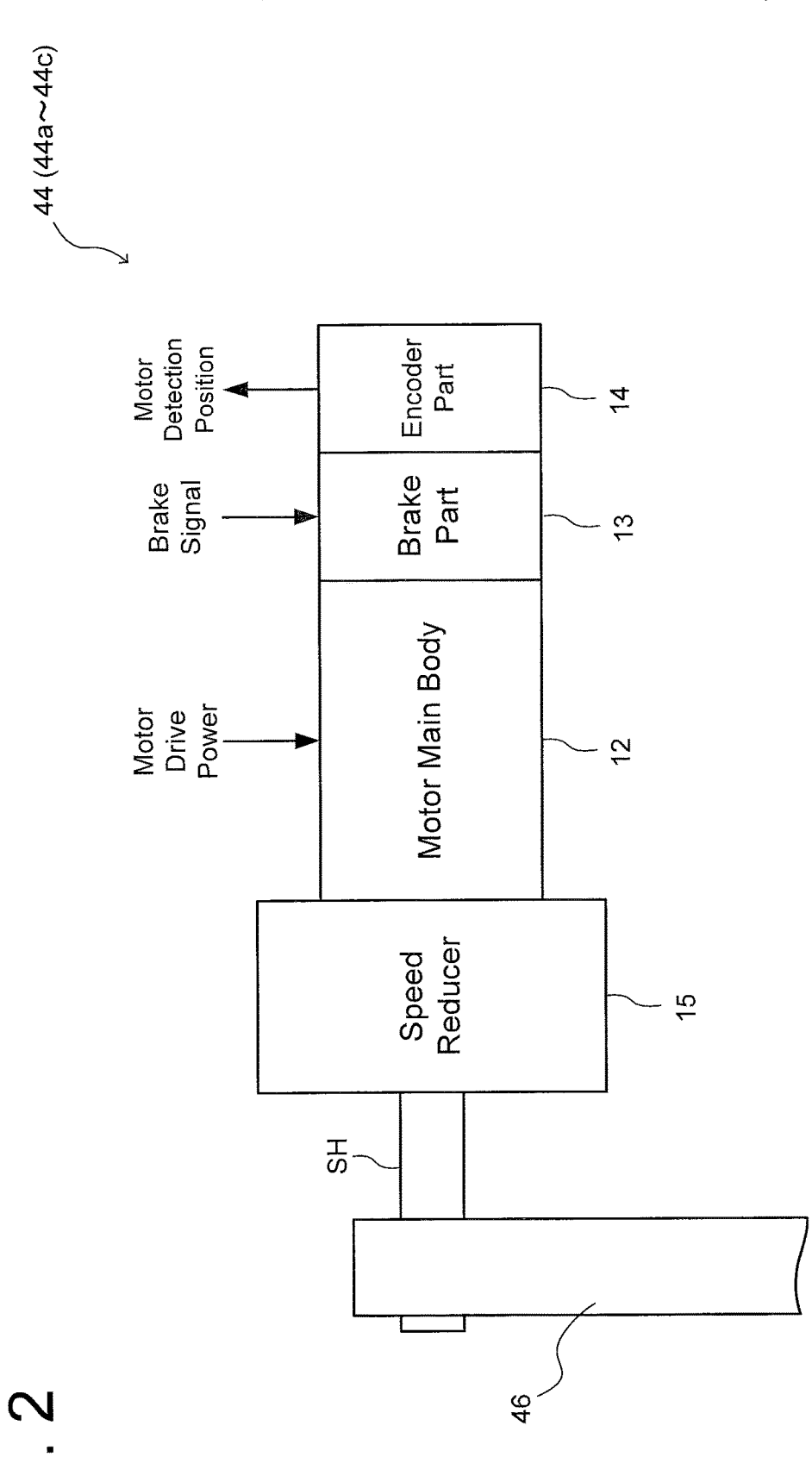
FIG. 2 is an example of a schematic configuration of a motor.

FIG. 2 illustrates an example of a schematic configuration of each of the motors 44a to 44c. The three motors 44a to 44c have the same configuration. As illustrated in FIG. 2, the motor 44 (44a to 44c) includes a motor main body 12, a brake part 13, an encoder part 14, and a speed reducer 15. The motors 44a to 44c correspond to examples of motors described in claims.

The motor main body 12 is a rotary type motor which includes a stator and a rotor (not illustrated) and in which the rotor rotates with respect to the stator when motor drive power is supplied.

The brake part 13 brakes the rotation of the rotor by receiving a brake signal.

The encoder part 14 detects the position of the rotor (also referred to as a "rotation position", a "rotation angle", or the like) and outputs the position as a motor detection position.

The speed reducer 15 uses a rotary shaft (not illustrated) of the rotator as an input shaft, and performs speed reduction conversion (position conversion, torque conversion) a shaft output of the speed reducer 15 via a gear reduction mechanism provided therein, and outputs the shaft output to the shaft SH. The drive links 46 (46a to 46c) is fixed to the shaft SH and is driven to swing.

1-3. Detailed Configuration of Robot Control Apparatus

Figure 3:
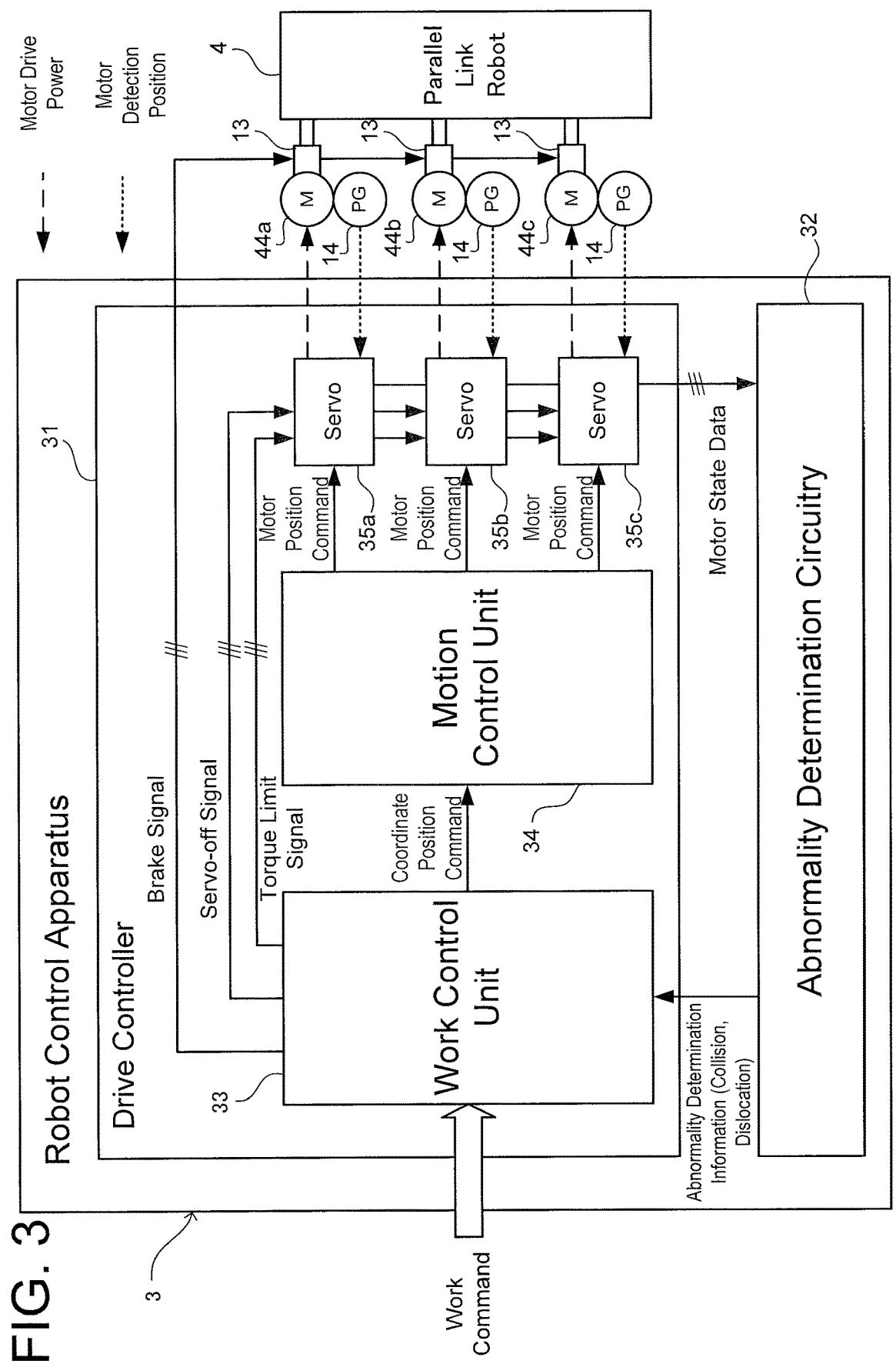
FIG. 3 is a diagram showing an example of the internal configuration of the robot control apparatus and various kinds of information transmitted and received around the robot control apparatus.

FIG. 3 illustrates an internal configuration of the robot control apparatus 3 and various kinds of information transmitted and received around the robot control apparatus 3. In FIG. 3, the robot control apparatus 3 includes a drive controller 31 and abnormality determination circuitry 32.

The drive controller 31 controls three motors 44a to 44c included in the parallel link robot 4. The drive controller 31 includes a work control unit 33, a motion control unit 34, and three servos 35a, 35b, and 35c corresponding to the respective motors 44a to. 44c The work control unit 33 outputs a coordinate position command, which is a movement destination position of the end effector of the parallel link robot 4, to the motion control unit 34 according to a work sequence corresponding to the work command input from the superordinate controller 2. The coordinate position command is a three-dimensional coordinate position on the robot coordinate system, and the work control unit 33 continuously outputs the coordinate position command as a movement destination position to which the end effector is to be moved next (movement is stopped by continuously outputting the same coordinate position).

In addition, the work control unit 33 can output a servo off signal for instructing all the servos 35 to stop supplying the motor driving power and a torque limit signal for instructing all the servos 35 to limit the output torque, as necessary, based on the abnormality determination information input from the abnormality determination circuitry 32 described later. In addition, the work control unit 33 can output a brake signal for braking rotation of the motor 44 with respect to the brake part 13 of all the motors 44 respectively as necessary, based on the abnormality determination information in the same manner. The operation of the end effector itself attached to the attachment member 45 of the parallel link robot 4 is also controlled by the work control unit 33 in accordance with the above-described operation sequence. However, for convenience of description, illustration and description regarding the control of the end effector will be omitted below. Further, the processing contents of the work control unit 33 will be described later.

The motion control unit 34 calculates a target position of each of the motors 44 necessary for the movement of the end effector to the coordinate position command input from the work control unit 33 by a so-called inverse kinematic calculation, and sequentially outputs the target position as a motor position command to the corresponding servo 35.

The servo 35 performs supply control of drive power for drive control (position control in this case) of the motor 44 based on the motor position command input from the motion control unit 34 while referring to the motor detection position detected from the encoder part 14 of the corresponding motor 44. Each servo 35 sequentially outputs the motor torque command generated therein and the motor detection position and the motor detection speed detected from the corresponding encoder part 14 as motor state data to the abnormality determination circuitry 32 described later (see FIG. 4 described later).

The abnormality determination circuitry 32 determines whether or not an abnormal state such as collision or dislocation described later occurs in the mechanism portion 50 of the parallel link robot 4 based on the motor state data (the motor torque command, the motor detection position, and the motor detection speed in this example) input from each servo 35, and outputs abnormality determination information including the determination result and information related thereto to the work control unit 33.

The processes in the drive controller 31 (the work control unit 33, the motion control unit 34, and the servo 35), the abnormality determination circuitry 32, and the like described above are not limited to the example of sharing of the processes. For example, the processes may be performed by a smaller number of processing units (for example, one processing unit), or some or all of the processes may be performed by more subdivided processing units. Further, the robot control apparatus 3 may be mounted as a software by a program executed by CPU 901 (arithmetic device, refer to FIG. 15) described later, or a part of or all of the robot control apparatus 3 may be mounted as a hardware by an actual device such as an application specific integrated circuit (ASIC), a field programmable gate array (FPGA), or another electric circuit.

1-4. Configuration of Control Processing in Servo

Figure 4:
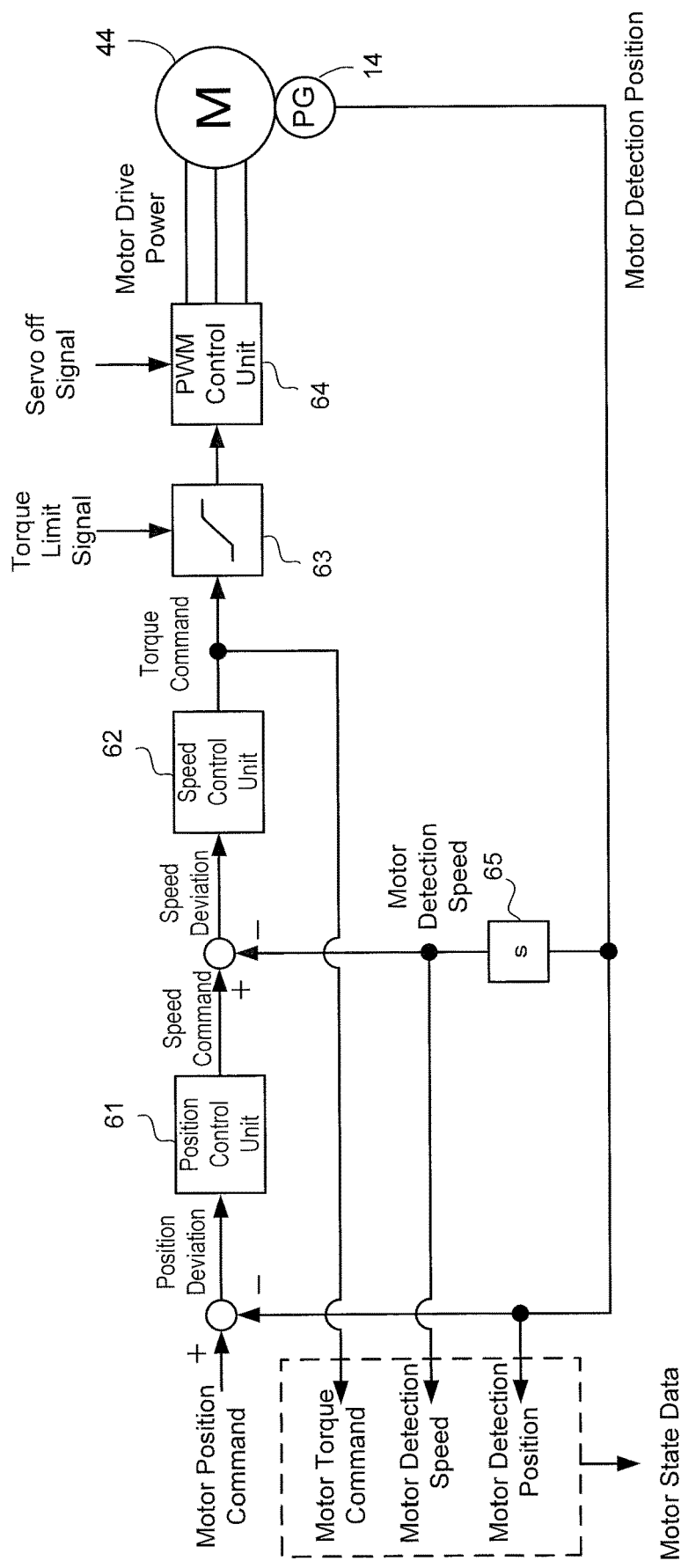
FIG. 4 is a diagram showing an example of a feedback loop processed in the servo.

FIG. 4 shows a feedback loop processed in the servo 35. The feedback loop shown in FIG. 4 is illustrated in a form of transfer function for a control process performed in the servo 35. In the example of the present embodiment, it is assumed that the servo 35 performs position control based on the motor position command output by the motion control unit 34, and the double loop processing of the position control feedback loop and the speed control feedback loop as shown in the drawing is executed correspondingly.

In the double loop processing, the deviation between the motor position command input from the motion control unit 34 and the motor detection position detected from the encoder part 14 is obtained as the position deviation, and the position control unit 61 generates the speed command based on the position deviation. Further, the deviation between the speed command and the motor detection speed detected from the encoder part 14 is obtained as the speed deviation, and the speed control unit 62 generates the motor torque command based on the speed deviation. The motor detection speed may be calculated by differentiating the motor detection position with respect to time by a differentiation operator 65 as illustrated in the drawing. Then, the PWM control unit 64 supplies drive power based on the motor torque command via the torque limiter 63 to drive the motor 44.

Here, the torque limiter 63 normally outputs the input motor torque command as it is but limits the value of the motor torque command with a preset upper limit value (or lower limit value) and outputs the motor torque command while the torque limit signal is input from the work control unit 33. The PWM control unit 64 supplies the motor driving power by the PWM control based on the motor torque command in a normal state but stops the supply of the motor driving power itself and makes the operation of the motor 44 free while the servo off signal is input from the work control unit 33 (hereinafter referred to as servo off).

1-5. Features of the Present Embodiment

As in the above configuration, the parallel link robot 4 generally includes the mechanism portion 50 of the closed link mechanism in which the plurality of link mechanism portions 43 are connected in parallel, and the drive controller 31 controls the plurality of motors (motors) that individually drive the respective link mechanism portions 43 in cooperation with each other, whereby an entirety of the mechanism portion 50 can be controlled to perform an arbitrary operation.

In the configuration in which the closed link mechanism is driven by the combined cooperative control of the plurality of motors as described above, the plurality of motors may add different torques to the link mechanism portions to cancel each other out in order to stabilize the state of the mechanism portion 50 depending on the arrangement and posture of the mechanism portion 50, and the relationship between the torques becomes complicated. Therefore, it is difficult to simply determine the occurrence of an operation abnormality such as a collision or dislocation in the mechanism portion 50 using only the behavior or state data of any one of the motors.

In contrast, the present embodiment includes the abnormality determination circuitry 32 that determines at least one of the collision and the dislocation in the mechanism portion 50 of the parallel link robot 4 based on the state data of the plurality of motors (the motor torque command, the motor detection position, and the motor detection speed in the example of the present embodiment).

Accordingly, it is possible to determine the occurrence of the collision with the outside in the mechanism portion 50 and the dislocation in each of spherical bearings 48, 49 with high accuracy on the basis of the state information of all of the plurality of motors 44a to 44c that drive the mechanism portion 50 of the parallel link robot 4. Methods necessary for realizing the above functions will be sequentially described below.

1-6. Basic Technique of Collision Determination

Figure 6:
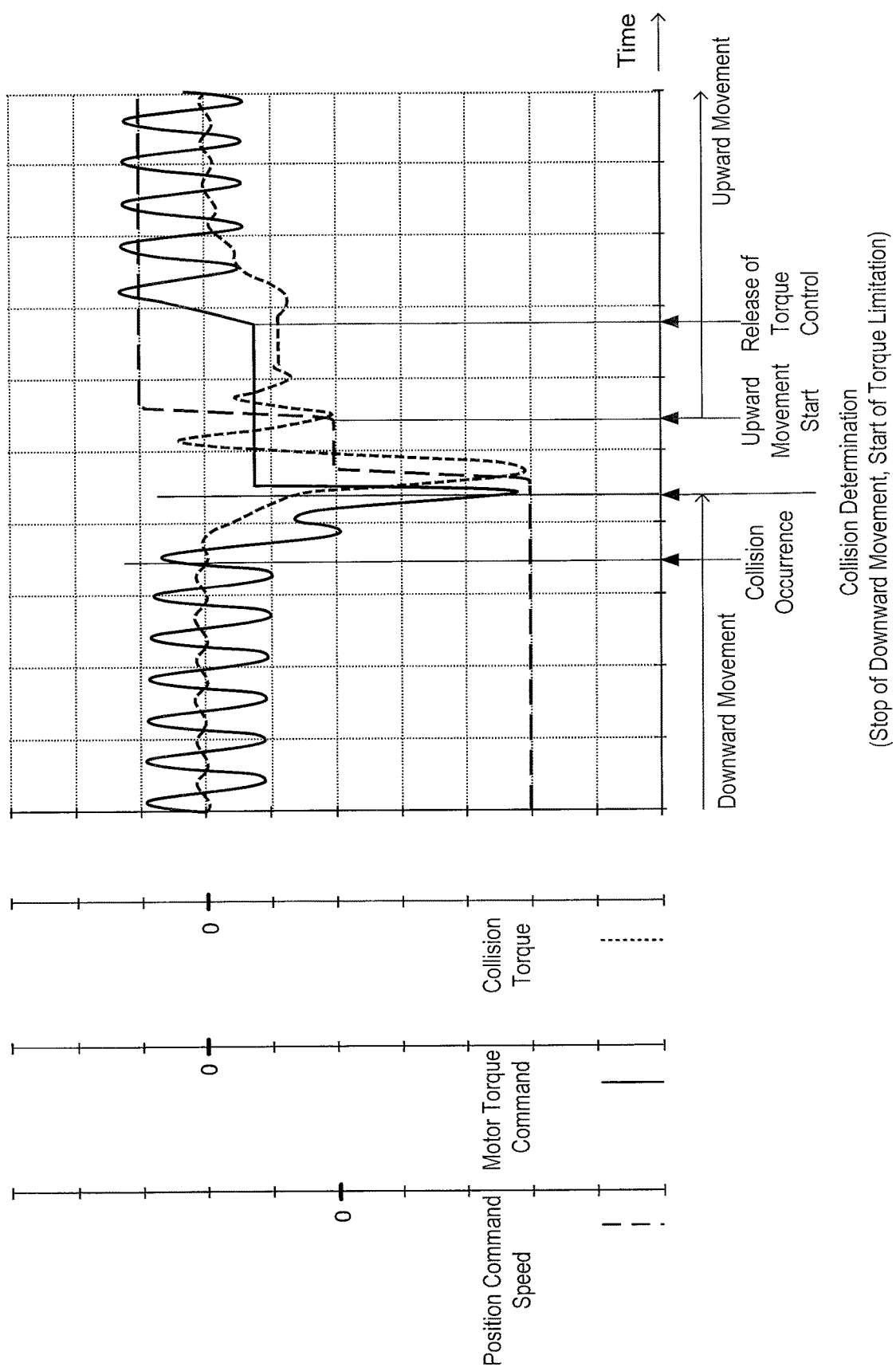
FIG. 6 is a diagram showing an example of a temporal change in state data of a motor in a control sequence of a uniaxial drive mechanism model.

First, a basic method of collision determination in the present embodiment will be described with reference to the uniaxial drive mechanism shown in FIGS. 5A, 5B and 5C as a model example. The uniaxial drive mechanism 70 shown in FIGS. 5A, 5B and 5C are configured to rotate a ball screw 71 vertically provided from a floor surface by a single motor 72 to move a link 73 up and down. In the present control sequence of coping with collision in the uniaxial drive mechanism 70, while moving the link 73 downward as shown in FIG. 5A and the foreign object 74 is unexpectedly collides with the link 73 as shown in FIG. 5B, the control sequence is performed to stop the movement and then move the link 73 upward so as to retreat the foreign object 74 from the link 73 as shown in FIG. 5C. FIG. 6 shows changes over time of the position command speed, the motor torque command, and the collision torque before and after the collision in such a control sequence. Note that the collision torque corresponds to a value obtained by converting a contact external force as a drag applied to the link 73 that has collided with the foreign object 74 into a disturbance torque.

As shown in FIG. 6, the motor torque command that has been stable during the downward movement of the link 73 greatly decreases immediately after the link 73 comes into contact with the foreign object 74 and collides with the foreign object 74, and the collision torque also greatly following the decrease in the motor torque command. This fluctuation results from attempting to realize the position command and the speed command inputted after the collision in the feedback loop of the servo which controls the motor 72. In the present control sequence, a collision is determined by detecting the motor torque command and the collision torque fluctuation. Especially in the present control sequence, the influence of the collision on the foreign object 74 can be suppressed by stopping the downward movement while limiting the motor torque command (limiting the torque) in the collision direction immediately after the collision determination, and then the link 73 is moved upward and retracted. Note that it is unnecessary to limit the torque in a pullback direction during the upward movement of this retreat.

Here, as shown in FIG. 5B, although the influence of the drag F1 received by the link 73 immediately after the link 73 comes into contact with the foreign object 74 and the influence of the foreign object 74 are relatively small, if the link 73 continues to move downward, the drag F2 received by the link 73 increases and the influence of the foreign object 74 also increases. For this reason, it is desirable to determine a collision as quickly as possible after the link 73 actually comes into contact with the foreign object 74 and stop the downward movement of the link 73. It is possible to consider a method of determining collision by comparing a threshold value set to be as small absolute value as possible with the motor torque command, however in this case, it is difficult to set the threshold value in consideration of the stability of the vertical movement of the link 73 in the normal state.

In other words, when the weight of the link 73 itself is sufficiently large or when a rapid lifting operation is performed, a large motor torque is required in each of the acceleration period and the deceleration period in the lifting movement, and a threshold value lower than the motor torque cannot be set. In addition, for example, in a case where the present invention is applied to a multi-joint robot driven by a plurality of axes for transferring a workpiece, the required motor torque changes in a complicated manner depending on an increase or decrease in weight due to gripping of the workpiece or the arrangement or posture of the link portion. In a case of controlling an operation of a closed link mechanism such as the parallel link robot 4 of this embodiment, there is a situation in which the plurality of motors 44 apply mutually different torques to the link mechanism portions 43, respectively, to stabilize the state depending on the arrangement and posture of each of the link mechanism portions 43, and the relationship between the torques becomes complicated. As described above, it is difficult to determine a collision in the motor drive mechanism simply by comparing the motor torque command with one fixed threshold value.

On the other hand, the abnormality determination circuitry 32 of the present embodiment estimates the contact external force F itself as a drag acting on the mechanism portion 50 from the foreign object 74 at the time of a collision and compares the contact external force F with a threshold value set to be sufficiently low, thereby performing a collision determination quickly and with high accuracy. The estimation of the contact external force F is performed by arithmetic processing based on a state data of a plurality of motors 44 (the motor torque command, the motor detection position, and the motor detection speed in the present embodiments).

1-7. Arithmetic Processing of Estimating Contact External Force

Hereinafter, an arithmetic processing of estimating the contact external force F acting on the mechanism portion 50 of the parallel link robot 4 will be described in detail. In the example of the present embodiment, a Lagrange equation of motion is derived based on specification parameters defined in the mechanism model of the parallel link robot 4 illustrated in FIGS. 7A and 7B, and the contact external force F acting on the mechanism portion 50 is calculated from the equation of motion.

First, the kinetic energy of the end effector can be described by the following equation.

$$T_p = \frac{1}{2} m_p \left( \dot{P}_x(t)^2 + \dot{P}_y(t)^2 + \dot{P}_z(t)^2 \right) \quad \text{(Expression 1)}$$

Similarly, the kinetic energies of the drive links 46 and the passive links 47 can be described by the following equation.

$$T_a = \frac{1}{2} J_a \left( \dot{\theta}_{a1}(t)^2 + \dot{\theta}_{a2}(t)^2 + \dot{\theta}_{a3}(t)^2 \right) + \quad \text{(Expression 2)}$$

$$T_b = \frac{3}{8}m_b\left(\dot{P}_x(t)^2 + \dot{P}_y(t)^2 + \dot{P}_z(t)^2\right) + \quad \text{(Expression 3)}$$

$$\frac{1}{2}\left(J_{b1}(t,\theta_{\beta 1})\dot{\theta}_{\beta 1}(t)^2 + J_{b2}(t,\theta_{\beta 2})\dot{\theta}_{\beta 2}(t)^2 + J_{b3}(t,\theta_{\beta 3})\dot{\theta}_{\beta 3}(t)^2\right) +$$

$$\frac{1}{8}m_a L_u^2\left(\dot{\theta}_{\alpha 1}(t)^2 + \dot{\theta}_{\alpha 2}(t)^2 + \dot{\theta}_{\alpha 3}(t)^2\right) +$$

$$\frac{1}{8}m_a L_u^2\left(\dot{\theta}_{\alpha 1}(t)^2 + \dot{\theta}_{\alpha 2}(t)^2 + \dot{\theta}_{\alpha 3}(t)^2\right) +$$

$$\sum_{i=1}^{3} \frac{1}{4} m_b L_u \dot{\theta}_{\alpha i}(t) \bigl(-\dot{P}_x(t)\cos(\phi_i)\sin(\theta_{\alpha i}(t)) -$$

$$\dot{P}_y(t)\sin(\phi_i)\sin(\theta_{\alpha i}(t)) - \dot{P}_z(t)\cos(\theta_{\alpha i}(t))\bigr)$$

The potential energy of the end effector can be expressed by the following equation.

$$U_p = m_p g_c P_z(t) \quad \text{(Expression 4)}$$

Similarly, the potential energies of the driving links 46 and the passive links 47 can be described by the following equation.

$$U_a = m_a g_c\left(O_z - \frac{1}{2}L_u \sin(\theta_{\alpha 1}(t))\right) + \quad \text{(Expression 5)}$$

$$m_a g_c\left(O_z - \frac{1}{2}L_u \sin(\theta_{\alpha 2}(t))\right) + m_a g_c\left(O_z - \frac{1}{2}L_u \sin(\theta_{\alpha 3}(t))\right)$$

$$U_b = m_b g_c\left(-\frac{1}{2}L_u \sin(\theta_{\alpha 1}(t)) + \frac{1}{2}P_z(t) + \frac{1}{2}O_z\right) + \quad \text{(Expression 6)}$$

$$m_b g_c\left(-\frac{1}{2}L_u \sin(\theta_{\alpha 2}(t)) + \frac{1}{2}P_z(t) + \frac{1}{2}O_z\right) +$$

$$m_b g_c\left(-\frac{1}{2}L_u \sin(\theta_{\alpha 3}(t)) + \frac{1}{2}P_z(t) + \frac{1}{2}O_z\right)$$

Figure 7A:
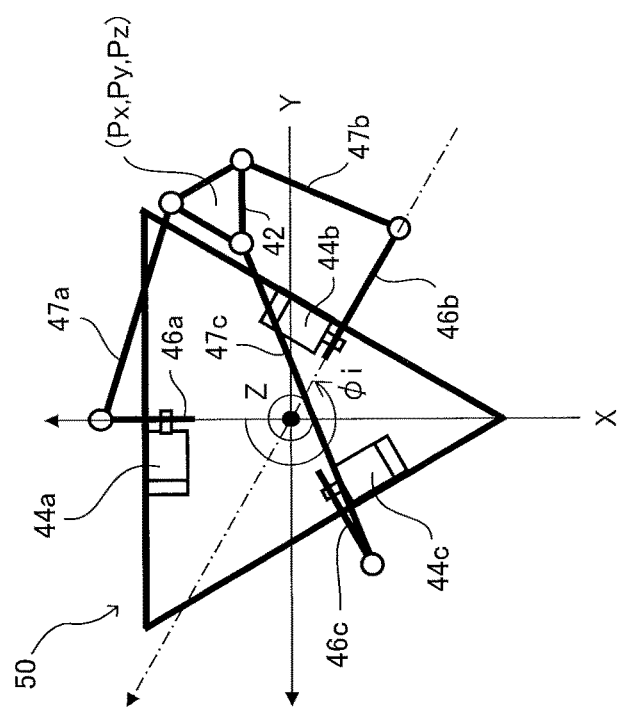
FIGS. 7A and 7B are diagrams showing an example of a mechanism model of the parallel link robot.
Figure 7B:
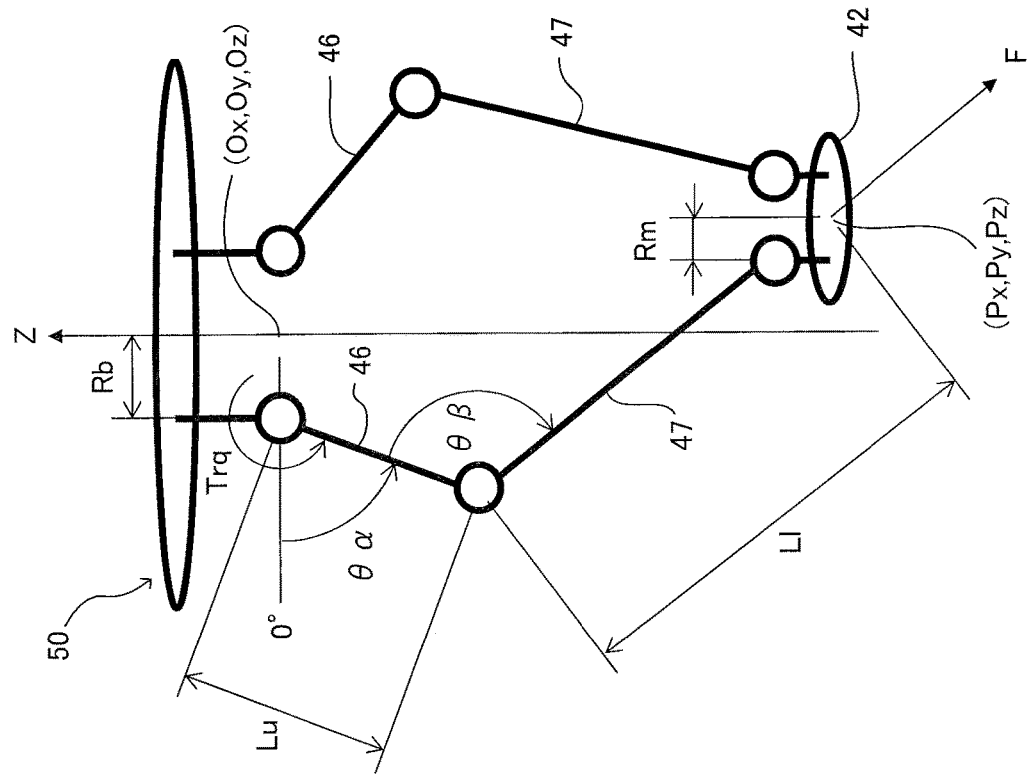

In (Expression 1) to (Expression 6) described above, specification parameters not described in FIGS. 7A and 7B are as follows.

$m_p$: Mass of the end effector
$m_a$: Mass of the drive link
$J_a$: Moment of inertia of the rotor and gear of the motor
$J_b$ (t, $\theta_b$): An inertial tensor matrix about the center of gravity relative to the XYZ plane of the passive links
$g_c$: Gravitational acceleration Wherein:

$$J_b = \text{Rot}(\delta x)\text{Rot}(\delta y)J'_b\text{Rot}(\delta y)^T\text{Rot}(\delta x)^T$$

Provided that $$\text{Rot}(\delta x) = \begin{bmatrix} 1 & 0 & 0 \\ 0 & \cos\left(\delta x - \frac{\pi}{2}\right) & -\sin\left(\delta x - \frac{\pi}{2}\right) \\ 0 & \sin\left(\delta x - \frac{\pi}{2}\right) & \cos\left(\delta x - \frac{\pi}{2}\right) \end{bmatrix}$$

$$\text{Rot}(\delta y) = \begin{bmatrix} \cos(\delta y) & 0 & -\sin(\delta y) \\ 0 & 1 & 0 \\ \sin(\delta y) & 0 & \cos(\delta y) \end{bmatrix}$$

$\delta x$ and $\delta y$ are rotation angles of the passive links 47 around the X axis and the Y axis.

$$J'_b = \frac{1}{12}m_b L_l^2 \begin{bmatrix} 1 & 0 & 0 \\ 0 & 1 & 0 \\ 0 & 0 & 0 \end{bmatrix}$$

Wherein: $m_a$: Mass of passive link
$L_l$: Length of passive link

Then, from the above (Expression 1) to (Expression 6), a Lagrange function such as the following expression can be obtained.

$$L = (T_p + T_a + T_b) - (U_p - U_a + U_b) \quad \text{(Expression 7)}$$

Wherein the generalized coordinates are $$q = [P_x\ P_y\ P_z\ \theta_{\alpha 1}\ \theta_{\alpha 2}\theta_{\alpha 3}]$$

The generalized force applied to the mechanism portion 50 is $$Q = [F_x\ F_y\ F_z\ Trq_1\ Trq_2\ Trq_3]$$

The equation of motion can be derived by calculating the following equation.

$$\frac{t}{dt}\left(\frac{\partial L}{\partial \dot{q}_j}\right) - \frac{\partial L}{\partial q_j} = Q_j \quad \text{(Expression 8)}$$

(where j=1 to 6)

The equation of motion based on the contact external force F (Fx, Fy, Fz) represented by the vectors in the X-axis direction, Y-axis direction, and Z axis direction and the shaft torques (Trq1, Trq2, Trq3) of the motors 44 can be obtained from the aforementioned (Expression 8). Since the contact external force F is 0 in a normal state in which the mechanism portion 50 is not in contact with a foreign object, Fx=Fy=Fz=0. The shaft torques (Trq1, Trq2, Trq3) are torques output from the shafts SH of the speed reducers 15 of the motors 44 to swingably drive the drive links 46 respectively, and are values corresponding to motor torque commands×η when the product of the speed reduction ratio and the speed reduction efficiency of the speed reducers 15 is η. In the example of the present embodiment, the contact external force F can be obtained by substituting the motor state data (motor torque command, motor detection position, motor detection speed) of each of the motors 44 and the position (Px, Py, Pz), speed, and acceleration of the end effector into a differential equation obtained by modifying the equation of motion in the aforementioned (Expression 8). The abnormality determination circuitry 32 may calculate the position, speed, and acceleration of the end effector by forward kinematic calculation based on the mechanical specifications shown in the mechanism model of FIGS. 7A and 7B and the motor state data input from the servos 35.

1-8. Content of Countermeasure Control for Each Axial Direction Against Collision In general, the pick-and-place operation performed by many parallel link robots 4 is classified into a moving operation in the horizontal direction (XY-axis direction) and a moving operation in the vertical direction (Z-axis direction) in terms of control, and is performed by combining them as necessary in many cases. In the work environment of performing the aforementioned pick-and-place operation, contents of operation control as required may be different in a case where the mechanism portion 50 collides with the foreign objects 74 and the like other than the workpiece in the horizontal direction from a case where it collides with them in the vertical direction. Therefore, in the present embodiments, the work control unit 33 of the drive controller 31 cooperatively controls the plurality of motors 44 so as to perform different handling operations in the horizontal direction (XY-axis direction) and the vertical direction (Z-axis direction) when a collision occurs in the mechanism portion 50.

1-8-1. Contents of Countermeasure Control Against Collision in XY-Axis Directions FIG. 8A is a side view showing a state in which the movable portion 42 of the parallel link robot 4 collides with the foreign object 74 mainly in the X and Y axis directions (horizontal directions), and FIG. 8B is a view showing a state in which the work control unit 33 controls the movable portion 42 to retreat in response to such a collision in the X and Y axis directions. As described above, the abnormality determination circuitry 32 substitutes the motor state data (motor torque command, motor detection position, motor detection speed) of each of the motors 44 and the position, speed, and acceleration of the end effector into a predetermined calculation formula obtained from the equation of motion, thereby sequentially calculating the contact external force F applied to the movable portion 42 at that time and outputting the contact external force F to the work control unit 33 as abnormality determination information.

Therefore, the absolute value of the resultant force Fxy obtained by combining the component forces Fx and Fy of the contact external force F in the X-axis direction and the Y-axis direction can be obtained by Fxy=(Fx2+Fy2)½. In addition, based on each of the numeral references of component forces Fx and Fy, direction of the resultant force Fxy can be obtained. When the absolute values of the resultant force Fxy, which is calculated, exceeds a predetermined threshold value, the abnormality determination circuitry 32 determines that a collision in the XY-axis direction has occurred. Further, when the absolute value of the component force Fz of the contact external force F in the Z-axis direction exceeds a separated threshold value, it can be simply determined that collision in Z-axis direction has occurred. In the two collision determinations described above, since the target to be compared with the threshold value is simply the contact external force applied to the mechanism portion 50, it is possible to perform collision determination with high accuracy and high sensitivity even when the threshold value is set to be sufficiently small.

In the example shown in FIG. 8A, since the component force Fz of the contact external force F, which is calculated, is sufficiently smaller than the corresponding threshold value and the resultant force Fxy is sufficiently larger than the corresponding threshold value, the abnormality determination circuitry 32 determines that only the collision in the XY-axis directions has occurred in the mechanism portion 50 (the movable portion 42). In a general working place of the parallel link robot 4, when the foreign object 74 collides with the mechanism portion 50 in the horizontal direction in this way, it may be possible to reduce an influence of collision on both of the mechanism portion 50 and the foreign object 74 by moving the mechanism portion 50 so as to separate from the collision point P in the horizontal direction. Therefore, in the present embodiment, when the abnormality determination circuitry 32 outputs the determination result indicating that the collision in the XY-axis directions has occurred and the resultant force Fxy as the abnormality determination information, the work control unit 33 outputs having received the abnormality determination information outputs an operation command to move the movable portion 42 to a position (predetermined position) horizontally away from the resultant force Fxy by a predetermined separation distance De as shown in FIG. 8B.

Although not particularly shown, instead of the resultant force Fxy, the component force Fx in the X-axis direction and the component force Fy in the Y-axis direction may be individually compared with threshold values to determine a collision for each axis direction, and each collision determination may be handled.

Figure 9A:
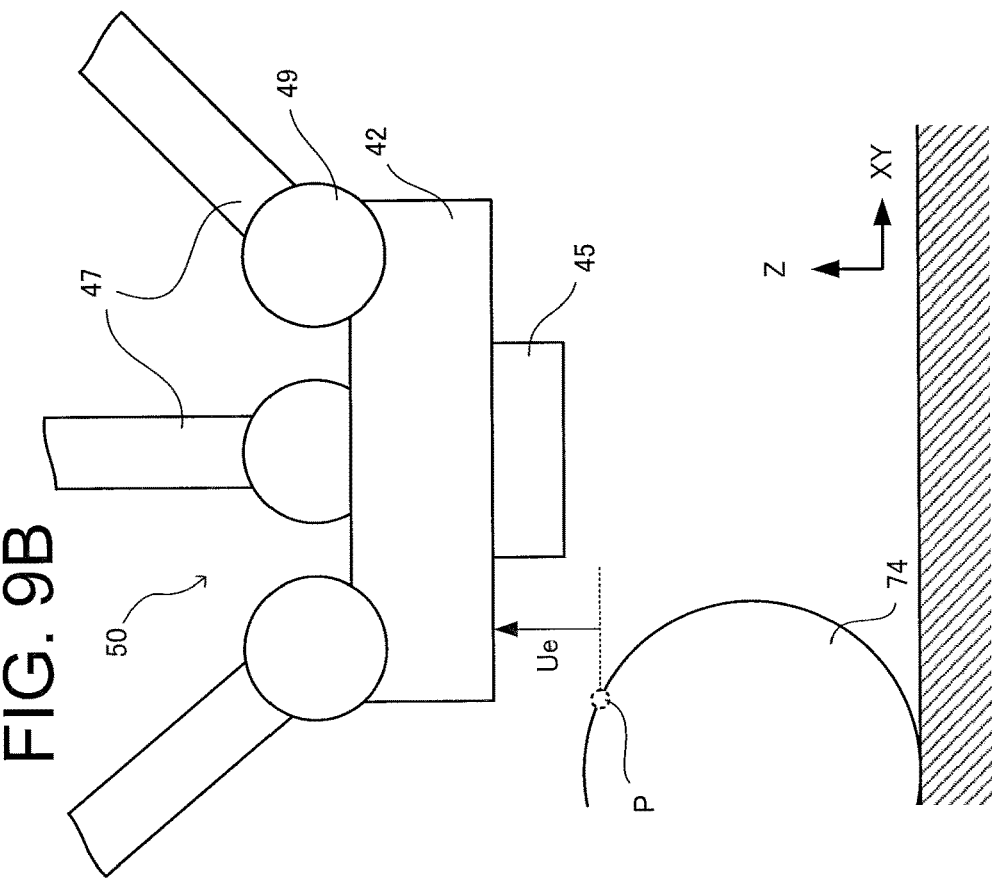
FIGS. 9A and 9B are diagrams showing an example of a countermeasure operation against a collision in the Z-axis direction.
Figure 9B:
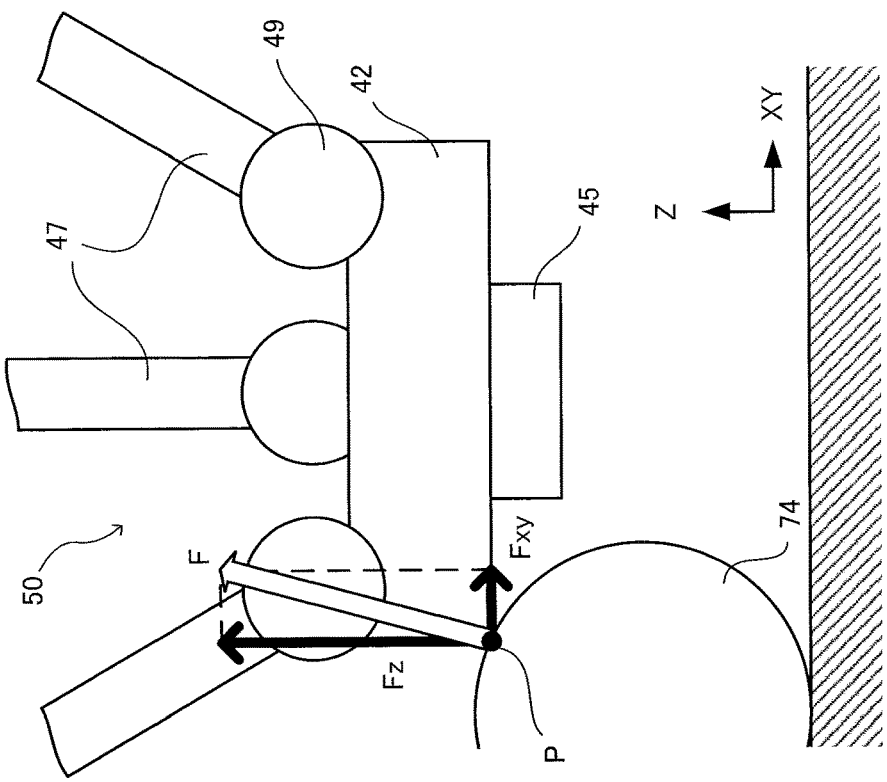

1-8-2. Content of Countermeasure Control Against Collision in Z-Axis Direction In addition, as in the example illustrated in FIG. 9A, when the resultant force Fxy of the contact external force F, which is calculated, is sufficiently smaller than the corresponding threshold value and the component force Fz is sufficiently larger than the corresponding threshold value, it is determined that only the collision in the Z-axis direction has occurred in the mechanism portion 50 (the movable portion 42). In the general working place of the parallel link robot 4, when a collision occurs in the vertical direction with respect to the mechanism portion 50, the mechanism portion 50 may sandwich the foreign object 74 between the mechanism portion 50 and the floor surface such as a belt conveyor (not illustrated) and press the foreign object 74 downward. Therefore, in the present embodiment, when the abnormality determination circuitry 32 outputs the determination result indicating that the collision in the Z-axis direction has occurred and the component force Fz as the abnormality determination information, the work control unit 33 receiving the abnormality determination information outputs an operation command to retreat the movable portion 42 to a position (predetermined position) separated from the component force Fz in the same direction (upward or downward) by a predetermined separation distance Ue set in advance, as illustrated in FIG. 9B. At this time, the work control unit 33 outputs the torque limit signal to all the servos 35 to limit the output torque of each of the motors 44, so that the influence of both the mechanism portion 50 and the foreign object 74 can be quickly and reliably reduced.

Depending on the contact direction between the mechanism 50 and the foreign object 74, it may be determined that a collision has occurred in both the XY-axis direction and the Z-axis direction. In this case, both handling controls (retreat movement) may be performed at the same time (not particularly illustrated).

1-9. Contents of Countermeasure Control for Dislocation

Figure 10A:
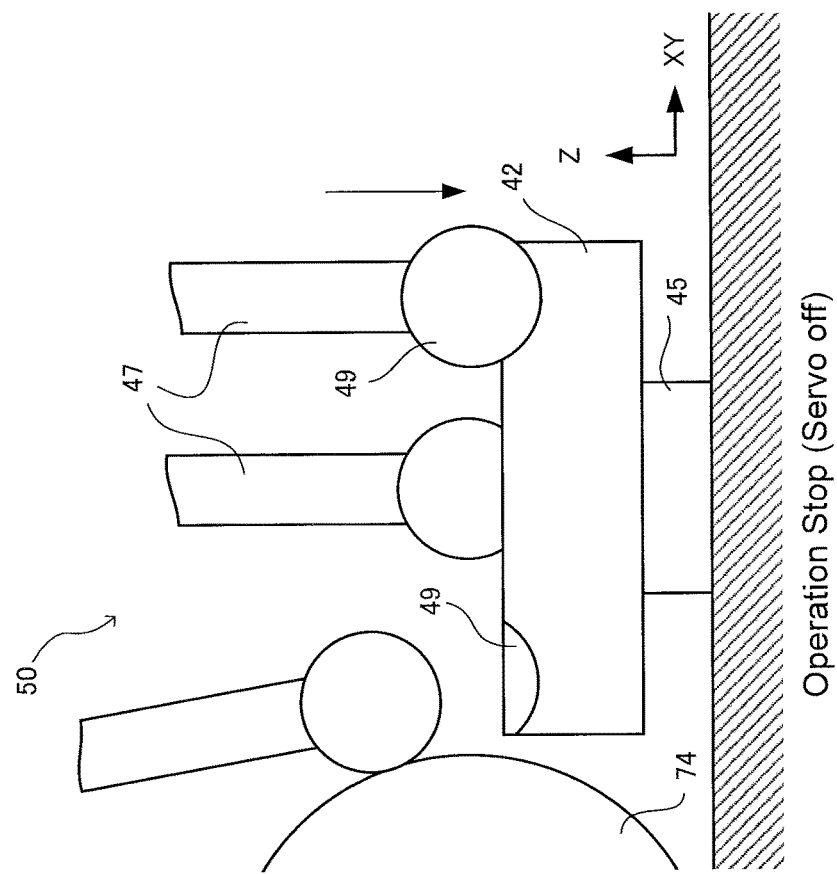
FIGS. 10A and B are diagrams showing an example of a countermeasure operation against dislocation.

For example, when the mechanism portion 50 suddenly collides with the foreign object 74, as illustrated in FIG. 10A, a dislocated state may occur in which the ball joint is detached from any one of the spherical bearings 48, 49 included in the mechanism portion 50. At this time, since the driving force of each of the motors 44 with respect to the mechanism portion 50 greatly changes, the contact external force F calculated by the abnormality determination circuitry 32 also greatly changes. In the example of the present embodiment, the abnormality determination circuitry 32 determines the difference in the contact external force F (or the temporal change thereof) between the case of collision and the case of dislocation, and thus the collision determination and the dislocation determination can be distinguished from each other.

Figure 10B:
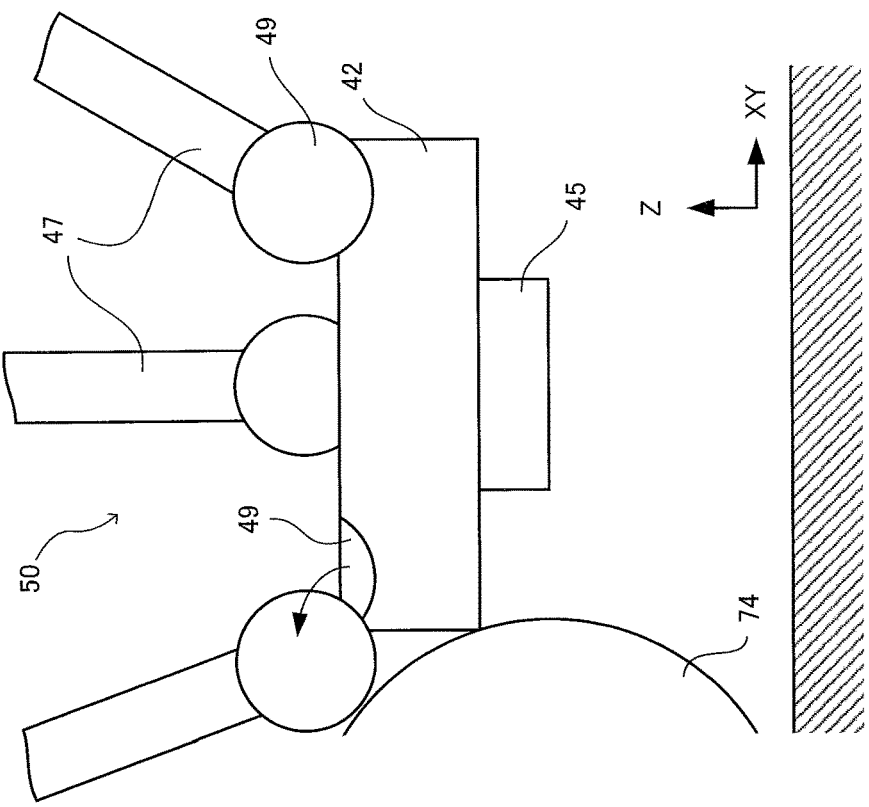

In a case where such a dislocation state occurs, it is preferable that unnecessary excitation force or binding force is not applied to each link mechanism portion 43 of the mechanism portion 50, and as shown in FIG. 10B, the entire mechanism portion 50 is lowered downward by a free operation by its own weight. Therefore, in the present embodiment, when the abnormality determination circuitry 32 outputs the dislocation determination as the abnormality determination information, the work control unit 33 that has received the abnormality determination information outputs the servo off signal to all the servos 35 and stops the supply of the driving power to each of the motors 44.

1-10. Control Flow

Figure 11:
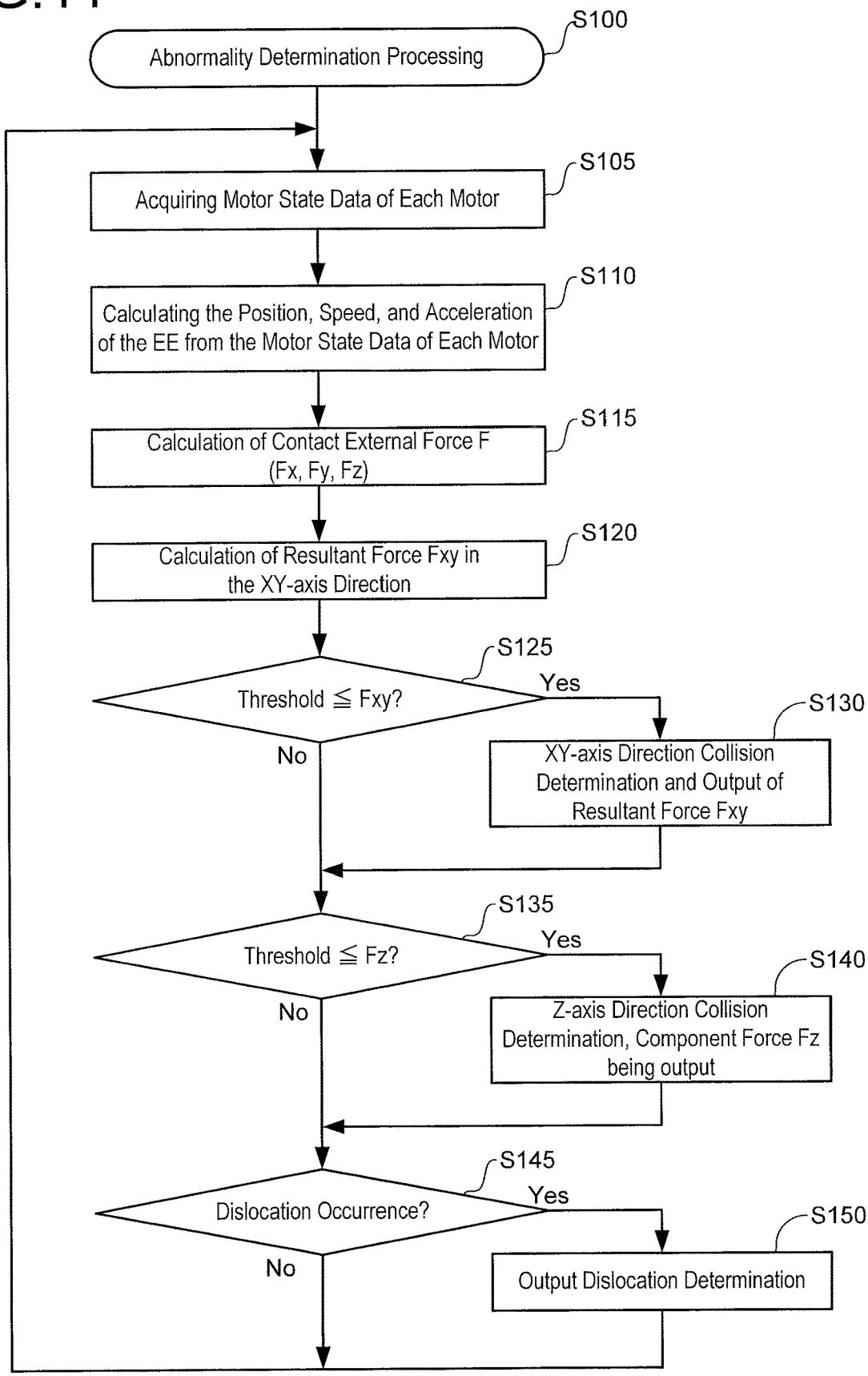
FIG. 11 is a flowchart showing an example of a control procedure of abnormality determination processing.
Figure 12:
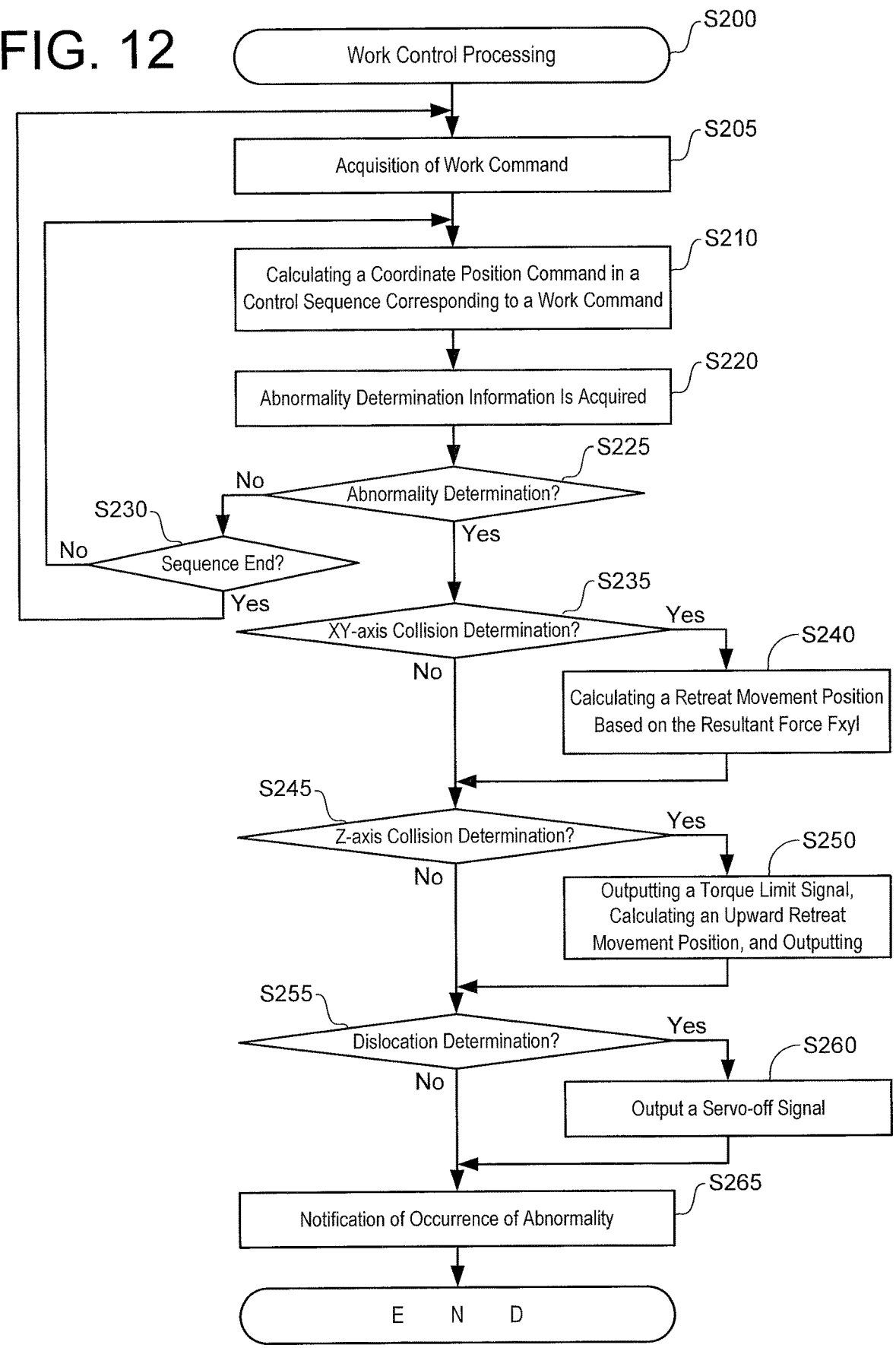
FIG. 12 is a flowchart showing an example of a control procedure of work control processing.

In order to realize the functions of the abnormality determination circuitry 32 and the work control unit 33 described above, a control procedure of an abnormality determination process and a work control process which are a software manner in the CPU 901 of the robot control apparatus 3 will be described with reference to flowcharts of FIGS. 11 and 12. FIG. 11 shows a flowchart in a case where the abnormality determination circuitry 32 is implemented in a software manner, and the execution is started when the control of the parallel link robot 4 is started.

First, in step S105, the CPU 901 of the robot control apparatus 3 acquires the motor torque command generated by each servo 35 and the detected motor detection position and motor detection speed as motor state data.

Next, the process moves to step S110, and the CPU 901 of the robot control apparatus 3 calculates the position, speed, and acceleration of the end effector (abbreviated as "EE" in the drawing) at that time by forward kinematic calculation based on the motor state date obtained in the step S105.

Next, the process moves to step S115, and the CPU 901 of the robot control apparatus 3 calculates the contact external force F (Fx, Fy, Fz) based on the motor state data acquired in step S105 and the position, speed, and acceleration of the end effector calculated in step S110. This calculation method in the present embodiment may be performed by arithmetic processing using the equation of motion of (Expression 8) described above.

Next, the process proceeds to step S120, and the CPU 901 of the robot control apparatus 3 calculates resultant forces Fxy based on the component forces Fx and Fy in the XY-axis directions of the contact external force F calculated in the step S115.

Next, the process proceeds to step S125, and the CPU 901 of the robot control apparatus 3 determines whether or not the resultant force Fxy calculated in the step S120 is equal to or greater than a corresponding threshold value, in other words, whether or not a collision in the XY-axis directions has occurred. When the resultant force Fxy is equal to or greater than the threshold value, the determination is satisfied (S125: YES), and the process proceeds to step S130.

In step S130, the CPU 901 of the robot control apparatus 3 outputs the determination result indicating that a collision has occurred in the XY-axis directions and the resultant force Fxy as abnormality determination information to the work control unit 33, and then proceeds to step S135.

On the other hand, when the resultant force Fxy is less than the threshold value in the determination of step S125, the determination is not satisfied (S125: NO), and the process proceeds to step S135.

In the step S135, the CPU 901 of the robot control apparatus 3 determines whether or not the component force Fz in the Z-axis direction of the contact external force F calculated in the step S115 is equal to or greater than a corresponding threshold value, in other words, whether or not a collision in the Z-axis direction has occurred. When the component force Fz is equal to or greater than the threshold value, the determination is satisfied (S135: YES), and the process proceeds to step S140.

In the step S140, the CPU 901 of the robot control apparatus 3 outputs the determination result indicating that a collision has occurred in the Z axis direction and the component force Fz as abnormality determination information to the work control unit 33, and then proceeds to the step S145.

On the other hand, when the component force Fz is less than the threshold value in the determination of step S135, the determination is not satisfied (S135: NO), and the process proceeds to step S145.

In the step S145, the CPU 901 of the robot control apparatus 3 determines whether or not dislocation has occurred based on the contact external force F (or a temporal change thereof) calculated in the step S115. When dislocation has occurred, the determination is satisfied (S145: YES), and the process proceeds to step S150.

In the step S150, the CPU 901 of the robot control apparatus 3 outputs determination result indicating that dislocation has occurred to the work control unit 33 as abnormality determination information, and then returns to step S105 to repeat the same procedure.

On the other hand, when the dislocation does not occur in the determination of the step S145, the determination is not satisfied (S145: NO), the process returns to the step S105, and the same procedure is repeated.

By repeating the above steps, when collision or dislocation occurs in the mechanism portion 50 of the parallel link robot 4, the abnormality determination circuitry 32 sequentially outputs information related to the determination result as the abnormality determination information to the work control unit 33.

Next, a control procedure of the work control process will be described with reference to a flowchart of FIG. 12. This work control process is executed in parallel with the abnormality determination process of FIG. 11 when the control of the parallel link robot 4 is started.

First, in step S205, the CPU 901 of the robot control apparatus 3 acquires a work command input from the superordinate controller 2.

Next, the process moves to step S210, and the CPU 901 of the robot control apparatus 3 calculates the next movement destination position of the end effector as a coordinate position command according to the control sequence corresponding to the work command acquired in the step S205, and outputs the calculated position to the motion control unit 34.

Next, the process proceeds to step S220, and the CPU 901 of the robot control apparatus 3 acquires the abnormality determination information input from the abnormality determination circuitry 32.

Next, the process proceeds to step S225, and the CPU 901 of the robot control apparatus 3 determines whether or not any abnormality determination result is included in the abnormality determination information acquired in the step S220, in other words, whether or not a determination result indicating that collision or dislocation has occurred is included in the abnormality determination information result is not included, the determination is not satisfied (S225: NO), and the process moves to step S230.

In step S230, the CPU 901 of the robot control apparatus 3 determines whether or not the work sequence being executed at that point in time has ended. If the work sequence has not ended and is being executed, the determination is not satisfied (S230: NO), and the process returns to step S210 and the same procedure is repeated.

On the other hand, when the work sequence is ended, the determination is satisfied (S230: YES), and the process returns to step S205 to repeat the same procedure.

On the other hand, in the determination of step S225, when the abnormality determination result is included in the abnormality determination information, the determination is satisfied (S225: YES), and the process proceeds to step S235. At this time, the coordinate position command may be temporarily fixed to stop the output position of each of the motors 44.

In step S235, the CPU 901 of the robot control apparatus 3 determines whether or not it is determined that a collision in the XY-axis direction has occurred, in other words, whether or not the abnormality determination information includes a determination result indicating that a collision in the XY-axis direction has occurred is determined that a collision in the XY-axis directions has occurred, the determination is satisfied (S234: YES), and the process proceeds to step S240.

In the step S240, the CPU 901 of the robot control apparatus 3 calculates a movement destination position at which the movable portion 42 is moved to be retracted based on the resultant force Fxy included in the abnormality determination information, and outputs the movement destination position to the motion control unit 34 as a coordinate position command, and then proceeds to the step S245.

On the other hand, in the determination of the step S235, when the occurrence of the collision in the XY-axis directions is not determined, the determination is not satisfied (S235: NO), and the process proceeds to the step S245.

In step S245, the CPU 901 of the robot control apparatus 3 determines whether or not it is determined that a collision in the Z-axis direction has occurred, in other words, whether or not the abnormality determination information includes a determination result indicating that a collision in the Z-axis direction has occurred. When it is determined that a collision in the Z-axis direction has occurred, the determination is satisfied (S245: YES), and the process proceeds to step S250.

In step S250, the CPU 901 of the robot control apparatus 3 outputs a torque limit signal to each servo 35, calculates a movement destination position at which the movable portion 42 is moved upward and retracted based on the component force Fz included in the abnormality determination information, and outputs the movement destination position to the motion control unit 34 as a coordinate position command, and then proceeds to step S255.

On the other hand, when the occurrence of collision in the Z-axis direction is not determined in the determination of step S245, the determination is not satisfied (S245: NO), and the process proceeds to step S255.

In step S255, the CPU 901 of the robot control apparatus 3 determines whether or not it is determined that dislocation has occurred, in other words, whether or not the abnormality determination information includes a determination result indicating that dislocation has occurred. When it is determined that dislocation has occurred, the determination is satisfied (S255: YES), and the process proceeds to step S260.

In the step S260, the CPU 901 of the robot control apparatus 3 outputs a servo-off signal to each servo 35, and then proceeds to the step S265.

On the other hand, when the occurrence of dislocation is not determined in the determination of step S255, the determination is not satisfied (S255: NO), and the process proceeds to step S265.

In the step S265, the CPU 901 of the robot control apparatus 3 notifies the user that an abnormality such as collision or dislocation has occurred in the mechanism portion 50 of the parallel link robot 4 via a display unit (not shown) or the like. Then, this flow ends.

1-11. Effect of Present Embodiment

As described above, the robot control apparatus 3 of the present embodiment includes the drive controller 31 that controls the plurality of motors 44 in the parallel link robot 4, and the abnormality determination circuitry 32 that determines at least one of collision and dislocation in the mechanism portion 50 of the parallel link robot 4 based on the state data (motor torque command, motor detection position, motor detection speed) of the plurality of motors 44. Thus, it is possible to determine with high accuracy the occurrence of collision with the outside in the mechanism portion 50 and dislocation in each of the spherical bearings 48, 49 based on all the state data of the plurality of motors 44 that drive the mechanism portion 50 of the parallel link robot 4.

The robot control system 1 of the example of the present embodiment uses the parallel link robot 4 that controls the plurality of the motors 44a to 44c by cooperatively driving the rotary motors. However, the robot control system 1 can also be applied to a case of using the parallel link robot (not particularly illustrated) that controls a plurality of linear motors by cooperatively driving the linear motors. In this case, the encoder part 14 is replaced with a linear scale capable of detecting the moving position (moving speed) of the movable element, and the speed reducer 15 is not necessary. In addition, the equation of motion of (Expression 8) may be derived based on the mechanism model of the parallel link robot using the linear motor.

Further, particularly in the present embodiment, when the abnormality determination circuitry 32 determines a collision, the drive controller 31 controls the plurality of motors 44 so that the operation of the mechanism portion 50 is different between a collision in the XY-axis direction and a collision in the Z-axis direction in the operation space of the XYZ-axis orthogonal coordinate system in which the Z-axis direction corresponds to the vertical direction. Thereby, it becomes possible to efficiently cope with a case where a collision is occurred in the pick-and-place operation of the parallel link robot 4 executed by combining the moving operation in the horizontal direction (XY-axis direction) and the moving operation in the vertical direction (Z-axis direction).

In addition, particularly in the present embodiment, when the abnormality determination circuitry 32 determines a collision in the XY-axis directions, the drive controller 31 controls the plurality of motors 44 so as to move the end effector included in the mechanism portion 50 to a relative position separated from the collision point P by a predetermined distance in the XY-axis directions. For example, even when a collision occurs horizontally with respect to the mechanism portion 50, the influence of the collision can be relatively reduced by both the mechanism portion 50 and the foreign object 74 by simply moving the mechanism portion 50 horizontally away from the collision direction in many cases. For the collision occurred in the horizontal direction as described above, it becomes possible to securely and appropriately address by cooperatively controlling the plurality of the motors 44 by the drive controller 31 so as to move only toward the predetermined position. Note that the movement destination position at the time of collision determination is not limited to the relative position from the collision point P as described above, and may be moved to an absolute position such as a so-called home position set in advance in the robot coordinate system.

For the collision occurred in the XY-axis direction, the movement of the end effector in the XY-axis direction may be promptly stopped. In other words, when the abnormality determination circuitry 32 determines the collision in the XY-axis direction, the drive controller 31 may control the plurality of motors 44 so as to stop the movement of the end effector included in the mechanism portion 50. For example, when the collision in the XY-axis direction occurs in the mechanism portion 50, the drive controller 31 needs to stop the movement of the end effector in the XY-axis direction at least in order not to increase the influence of the collision in both the mechanism portion 50 and the foreign object 74. For the collision occurred in the horizontal direction as described above, it becomes possible to reduce the load on an arithmetic processing in the drive controller 31 by cooperatively controlling the plurality of motors 44 by the drive controller 31 so as to stop the movement in the XY-axis direction rather than to move toward the predetermined position, and this enables to securely and appropriately address the collision. For the movement stop control in this time, the work control unit 33 may continue to output the coordinate position command and clamp the position of the end effector. Alternatively, the work control unit 33 may output a servo-off signal to stop the supply of motor drive power to each of the motors 44, and may output a brake signal to brake the position of each of the motors 44.

In addition, particularly in the present embodiment, when the abnormality determination circuitry 32 determines a collision in the Z-axis direction, the drive controller 31 controls the plurality of motors 44 so as to limit the output torque of the plurality of motors 44 and move the end effector included in the mechanism portion 50 to a relative position separated from the collision point P to a predetermined position in the Z-axis direction. For example, when a collision occurs in the vertical direction with respect to the mechanism portion 50, the mechanism portion 50 may sandwich the foreign object 74 between the mechanism portion 50 and the floor surface such as a belt conveyor and press the foreign object 74 downward. In contrast, it is possible to promptly and securely reduce the influence of both of the mechanism portion 50 and the foreign object 74 not only by moving the mechanism portion 50 from the collision direction thereof to the vertical direction (upward direction, downward direction) but also by limiting the output torque of each motor 44. Note that the movement destination position at the time of collision determination is not limited to the relative position from the collision point P as described above, and may be moved to an absolute position such as a so-called home position set in advance in the robot coordinate system.

In addition, particularly in the present embodiment, when the abnormality determination circuitry 32 determines dislocation, the drive controller 31 stops controlling the plurality of motors 44. Thus, for example, even when dislocation occurs in the spherical bearings 48, 49 and the mechanism portion 50 is disassembled, the work control unit 33 outputs the servo-off signal and stops the control by servo-off that stops the supply of the motor drive power to each of the motors 44. Thus, free operation can be allowed without applying unnecessary excitation force or binding force to each link mechanism, and interference with the surroundings can be reduced.

1-12. Modification

It should be noted that various modifications can be made to the embodiment described above without departing from the effect and technical idea thereof.

In the above embodiment, the abnormality determination circuitry 32 calculates the contact external force F estimated to be applied to the mechanism portion 50 based on the state data (motor torque command, motor detection position, motor detection speed) of each motor 44, and directly determines the occurrence of collision and dislocation of the mechanism portion 50 from the contact external force F, but it is not limited thereto. Further, disturbance torque of each motor 44 may be estimated from the contact external force F which is calculated, and collision and dislocation may be determined based on the disturbance torque. In this case, the disturbance torque corresponds to a latent torque value included in the motor torque command of each motor 44 as a drag component with respect to the contact external force F. The disturbance torque may be estimated by converting the contact external force F into an estimated disturbance of each motor 44 by a disturbance observer appropriately designed for each motor 44 in consideration of the mechanism model F as shown in FIGS. 7A and 7B into the estimated disturbance of each motor 44. The disturbance observer may be designed based on the relationship between shaft torque Trq and the contact external force F of the generalized force Q in the above described (Expression 8) (not particularly shown).

Since the disturbance torque of each motor 44 estimated in this manner is simply a torque value corresponding to the contact external force F applied to the mechanism portion 50, it is possible to perform collision determination with high accuracy and high sensitivity by comparing the disturbance torque with a threshold value set to a sufficiently low value. In addition, it is possible to perform dislocation determination with high accuracy by performing dislocation determination based on the disturbance torque. In order to estimate the contact external force F and the disturbance torque with higher accuracy, the encoder part 14 of the motor 44 may detect the rotational position of the shaft SH, which is the output shaft of the speed reducer 15, instead of the rotor of the motor 44 as the motor detection position, and the position, speed, acceleration, contact external force F, and disturbance torque of the encoder may be estimated with reference to the corresponding motor torque command and motor detection speed.

2. Second Embodiment

In the first embodiment described above, the contact external force F used for determination of collision or dislocation is calculated from the equation of motion based on the state data of each motor 44, but the present invention is not limited thereto. The contact external force F can be obtained based on a comparison between detection value of the sensor provided in the mechanism portion 50 and state data of the motor. Hereinafter such configuration of the second embodiments will be described. Note that an illustration and an explanation of the configuration and processing equivalent to those of the first embodiment described above will be omitted.

Figure 13:
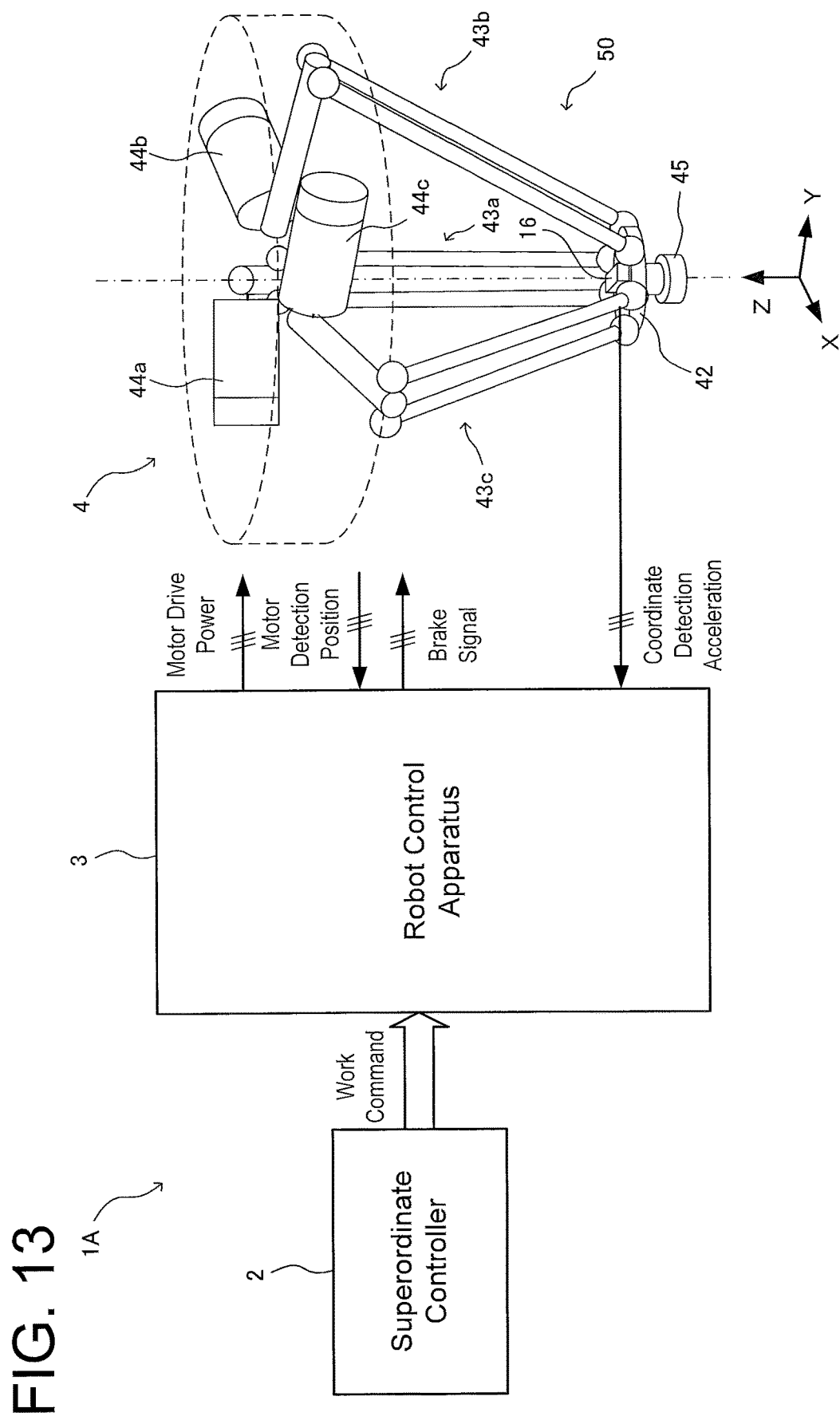
FIG. 13 is a perspective view showing an example of the overall configuration of the robot control system according to the second embodiment.
Figure 14:
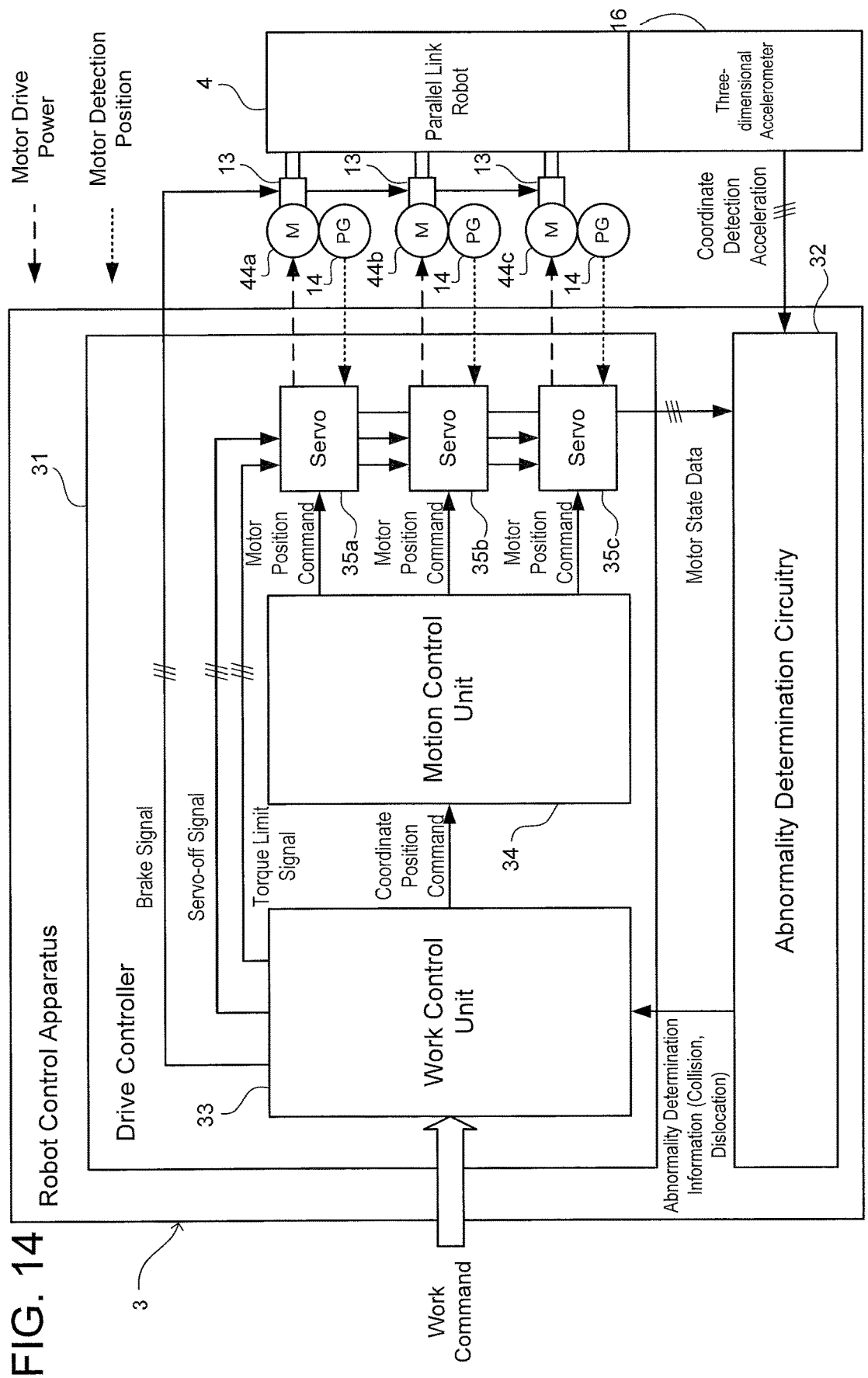
FIG. 14 is a diagram showing an example of the internal configuration of the robot control apparatus and various kinds of information transmitted and received around the robot control apparatus.

FIG. 13 corresponding to FIG. 1 shows a schematic configuration of the robot control system 1A in the present embodiment. In FIG. 13, the parallel link robot 4 includes a three-dimensional accelerometer 16 on the upper surface of the movable portion 42. The three-dimensional accelerometer 16 detects accelerations of the movable portion 42 corresponding to the X-axis direction, the Y-axis direction, and the Z-axis direction of the robot coordinate system as coordinate detection accelerations, and outputs the coordinate detection accelerations to the robot control apparatus 3. FIG. 14 corresponding to FIG. 3 illustrates the internal configuration of the robot control apparatus 3 in the present embodiments and various kinds of information transmitted and received in and around thereof.

In FIG. 14, the coordinate detection accelerations detected by the three-dimensional accelerometer 16 are input to the abnormality determination circuitry 32 of the robot control apparatus 3.

In the robot control system 1A having the above-described configuration, the abnormality determination circuitry 32 can calculate the accelerations (and the positions and the speeds) of the end effector based on the motor state data input from the servos 35 and estimate the contact external force F acting on the mechanism portion 50 based on the calculated values and the coordinate detection accelerations input from the three-dimensional accelerometer 16. For example, it is considered that the differences between the calculated accelerations and the coordinate detection accelerations of the end effector are proportional to the component forces Fx, Fy, and Fz of the contact external force F (F=a·m) in each of the axial directions of the X, Y, and Z axes. In consideration of each of the specification parameters of the mechanism model illustrated in FIGS. 7A and 7B based on the above-described consideration, the component forces Fx, Fy, and Fz of the contact external force F in each of the axial directions of the X, Y, and Z axes can be respectively obtained. Further, the disturbance torque of each of the motor 44 can be estimated by the contact external force F as calculated above.

Accordingly, in the second embodiment, the contact external force F in the respective axial directions acting on the mechanism portion 50 can be easily calculated by a calculation process with a smaller load as compared with the first embodiment using the equation of motion. Further, the disturbance observer designed based on the above (Expression 8) can also calculate the disturbance torque with reference to the motor state data input from each servo 35.

3. Hardware Configuration Example of Robot Control Apparatus

Next, an example of a hardware configuration of the robot control apparatus 3 that realizes processing by the drive controller 31 (the work control unit 33, the motion control unit 34, and the servo 35) implemented as a software by the above-described program executed by the CPU 901, and the abnormality determination circuitry 32 and the like will be described with reference to FIG. 15.

Figure 15:
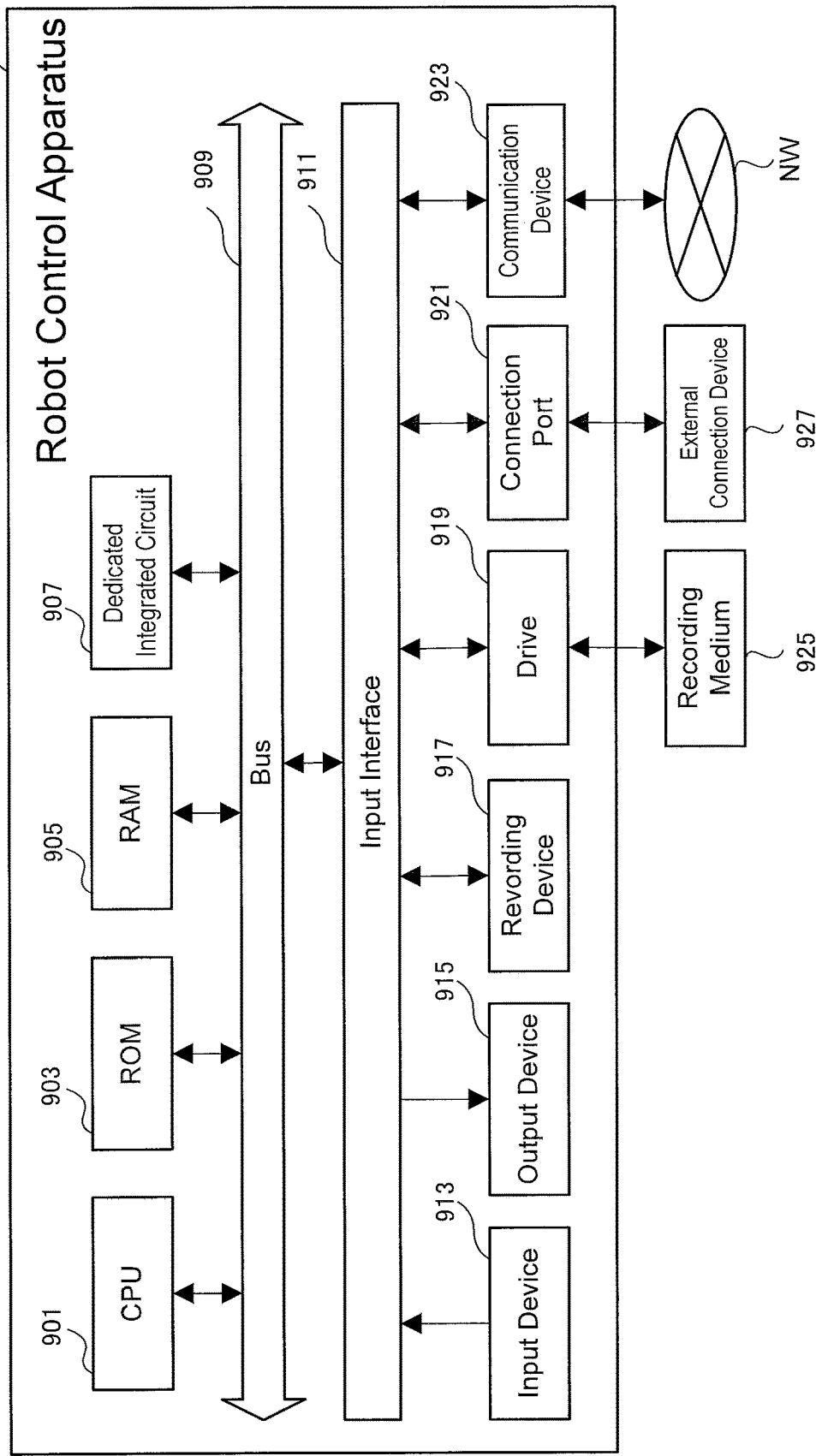
FIG. 15 is a system block diagram showing the hardware configuration of the robot control apparatus.

As illustrated in FIG. 15, the robot control apparatus 3 includes, for example, a CPU 901, a ROM 903, a RAM 905, a dedicated integrated circuit 907 constructed for a specific application such as an ASIC or an FPGA, an input device 913, an output device 915, a recording device 917, a drive 919, a connection port 921, and a communication device 923, which are connected to each other via a bus 909 or an input/output interface 911 so as to transmit signals to each other.

The program can be recorded in, for example, a ROM 903, a RAM 905, or the recording device 917 and the like.

In addition, the program may be temporarily or permanently recorded in a removable recording medium 925 such as a magnetic disk such as a flexible disk, an optical disk such as various CDs, MO disks, or DVDs, or a semiconductor memory. Such a recording medium 925 may be provided as so-called package software. In this case, the program recorded in the recording medium 925 may be read by the drive 919 and recorded in the recording device 917 via the input/output interface 911, the bus 909, or the like.

In addition, the program may be recorded in, for example, a download site, another computer, another recording device, or the like (not illustrated). In this case, the program is transferred via a network NW such as a LAN or the Internet, and the communication device 923 receives the program. And the program received by the communication device 923 may be recorded in the recording device 917 via the input/output interface 911, the bus 909, or the like.

In addition, the program may be recorded in, for example, an appropriate external connection device 927. In this case, the program may be transferred through an appropriate connection port 921 and recorded in the recording device 917 through the input/output interface 911, the bus 909, or the like.

Then, the CPU 901 executes various processes in accordance with the program recorded in the recording device 917, whereby the processes by the drive controller 31 (the work control unit 33, the motion control unit 34, and the servo 35), the abnormality determination circuitry 32, and the like are realized. At this time, the CPU 901 may directly read and execute the program from the recording device 917 or may temporarily load the program into the RAM 905 and execute the program. Further, when the CPU 901 receives the program via the communication device 923, the drive 919, or the connection port 921, the received program may be directly executed without being recorded in the recording device 917.

In addition, the CPU 901 may perform various processes as necessary based on signals or information input from the input device 913 such as a mouse, a keyboard, and a microphone (not illustrated).

Then, the CPU 901 may output the result of execution of the above processing from the output device 915 such as a display device or an audio output device, and further, the CPU 901 may transmit the processing result via the communication device 923 or the connection port 921 as necessary, or may record the processing result in the recording device 917 or the recording medium 925.

In the above description, when there are descriptions such as "vertical", "parallel", and "plane", these descriptions do not have a strict meaning, that is, these "vertical", "parallel", and "plane "mean" substantially vertical", "substantially parallel", and "substantially plane", respectively, in which design and manufacturing tolerances and errors are allowed.

In addition, in the above description, when there are descriptions such as "same", "equal", and "different" in terms of dimension, size, shape, position, and the like in terms of appearance, the descriptions do not have a strict meaning. That is, the terms "same", "equal", and "different" mean "substantially the same", "substantially equal", and "substantially different", respectively, design and manufacturing tolerances and errors are allowed.

In addition to those already described above, the techniques according to the above—described embodiments and modifications may be appropriately combined and used. In addition, although not illustrated, the above-described embodiments and modifications are implemented with various changes added thereto without departing from the purpose thereof.

What is claimed is:

1. A robot control apparatus comprising:
a drive controller configured to control a plurality of motors which are configured to drive a plurality of link mechanisms of a parallel link robot, respectively; and
abnormality determination circuitry configured to determine based on state data of the plurality of motors whether collision between the parallel link robot and an object outside of the parallel link robot occurs,
the drive controller being configured to control the plurality of motors so that the plurality of link mechanisms retreat when it is determined that the collision occurs,
wherein, when the abnormality determination circuitry determines that the collision occurs, the drive controller controls the plurality of motors such that movement of an attachment member which is connected to the plurality of link mechanisms and to which an end effector is configured to be attached is different between XY collision in an XY-axis directions and Z collision in a Z-axis direction in an operation space of an XYZ-axis orthogonal coordinate system in which the Z-axis direction corresponds to a vertical direction.

2. The robot control apparatus according to claim 1, wherein the drive controller controls the plurality of motors so as to move the attachment member to a predetermined position when the abnormality determination circuitry determines that the XY collision occurs.

3. The robot control apparatus according to claim 1, wherein the drive controller controls the plurality of motors so as to stop movement of the attachment member when the abnormality determination circuitry determines that the XY collision occurs.

4. The robot control apparatus according to claim 1, wherein the drive controller controls the plurality of motors so as to limit output torques output by the plurality of motors and move the attachment member to a predetermined position when the abnormality determination circuitry determines that the Z collision occurs.

5. The robot control apparatus according to claim 1, wherein the state data of the plurality of motors includes motor torque, motor position, and motor speed of the plurality of motors.

6. The robot control apparatus according to claim 1, wherein the plurality of motors include a plurality of linear motors.

7. The robot control apparatus according to claim 1, wherein the drive controller controls the plurality of motors so as to move a movable portion of the parallel link robot to a position separated from a collision point by a predetermined distance when it is determined that the collision occurs.

8. The robot control apparatus according to claim 1,
wherein the abnormality determination circuitry is configured to determine whether the collision occurs by comparing an external force acting on the plurality of link mechanisms with a threshold value, and
wherein the drive controller controls the plurality of motors to retreat a movable portion of the parallel link robot to a position separated from the external force in a direction of the external force by a predetermined separation distance set in advance when it is determined that the collision occurs.

9. The robot control apparatus according to claim 1, further comprising:
encoder units configured to detect positions of rotors of the plurality of motors,
wherein the abnormality determination circuitry is configured to determine whether the collision occurs by comparing an external force acting on the plurality of link mechanisms with a threshold value, the external force is estimated based on:
the state data including torque commands output by the drive controller to the plurality of motors; and
detected positions of the plurality of motors detected by the encoder units.

10. A robot control system comprising:
a parallel link robot comprising;
a plurality of link mechanisms; and
a plurality of motors configured to drive the plurality of link mechanisms, respectively; and
a robot control apparatus comprising:
a drive controller configured to control the plurality of motors; and
abnormality determination circuitry configured to determine based on state data of the plurality of motors whether collision between the parallel link robot and an object outside of the parallel link robot occurs,
the drive controller being configured to control the plurality of motors so that the plurality of link mechanisms retreat when it is determined that the collision occurs,
wherein the drive controller controls the plurality of motors so as to move a movable portion of the parallel link robot to a position separated from a collision point by a predetermined distance when it is determined that the collision occurs.

11. The robot control system according to claim 10,
wherein the abnormality determination circuitry is configured to determine whether the collision occurs by comparing an external force acting on the plurality of link mechanisms with a threshold value, and
wherein the drive controller controls the plurality of motors to retreat a movable portion of the parallel link robot to a position separated from the external force in a direction of the external force by a predetermined separation distance set in advance when it is determined that the collision occurs.

12. The robot control system according to claim 10, further comprising:
encoder units configured to detect positions of rotors of the plurality of motors,
wherein the abnormality determination circuitry is configured to determine whether the collision occurs by comparing an external force acting on the plurality of link mechanisms with a threshold value, the external force is estimated based on:
the state data including torque commands output by the drive controller to the plurality of motors; and
detected positions of the plurality of motors detected by the encoder units.

13. A robot control apparatus comprising:
a drive controller configured to control a plurality of motors which are configured to drive a plurality of link mechanisms of a parallel link robot, respectively;
abnormality determination circuitry configured to determine based on state data of the plurality of motors whether collision between the parallel link robot and an object outside of the parallel link robot occurs; and
encoder units configured to detect positions of rotors of the plurality of motors, wherein the abnormality determination circuitry is configured to determine whether the collision occurs by comparing an external force acting on the plurality of link mechanisms with a threshold value, the external force is estimated based on:
the state data including torque commands output by the drive controller to the plurality of motors; and
detected positions of the plurality of motors detected by the encoder units.

* * * * *